US006510359B1

(12) United States Patent
Merkle et al.

(10) Patent No.: US 6,510,359 B1
(45) Date of Patent: Jan. 21, 2003

(54) METHOD AND SYSTEM FOR SELF-REPLICATING MANUFACTURING STATIONS

(75) Inventors: Ralph C. Merkle, Sunnyvale, CA (US); Eric G. Parker, Wylie, TX (US); George D. Skidmore, Plano, TX (US)

(73) Assignee: Zyvex Corporation, Richardson, TX (US)

( * ) Notice: Subject to any disclaimer, the term of this patent is extended or adjusted under 35 U.S.C. 154(b) by 0 days.

(21) Appl. No.: 09/569,330

(22) Filed: May 11, 2000

(51) Int. Cl.$^7$ .............................................. G06F 19/00

(52) U.S. Cl. .......................... 700/121; 700/95; 700/245

(58) Field of Search ...................... 700/95, 96, 121, 700/245, 246

(56) References Cited

U.S. PATENT DOCUMENTS

| | | | | |
|---|---|---|---|---|
| 4,740,410 A | | 4/1988 | Muller et al. ............... | 428/133 |
| 5,645,684 A | | 7/1997 | Keller ..................... | 156/643.1 |
| 5,659,477 A | * | 8/1997 | Collins ....................... | 700/117 |
| 5,660,680 A | | 8/1997 | Keller ....................... | 438/50 |
| 5,764,518 A | * | 6/1998 | Collins ....................... | 700/117 |
| 5,988,845 A | * | 11/1999 | Murata ........................ | 700/2 |
| 5,994,159 A | * | 11/1999 | Aksyuk et al. ............. | 257/415 |
| 6,185,107 B1 | * | 2/2001 | Wen ........................... | 174/256 |
| 6,233,502 B1 | * | 5/2001 | Yim ........................... | 336/225 |

FOREIGN PATENT DOCUMENTS

DE           197 08 472 A       9/1998

OTHER PUBLICATIONS

Mohr, J., "Liga—A Technology For Fabricating Microstructures and Microsystems," Sensors and Meterials, Scientific Publishing Division of MYU, Tokyo, JP, vol. 10, Nr. 6, pp. 363–373 XP000818653.

Merkle, R.C., "Self Replicating Systems and Molecular Manufacturing," Journal of the British Interplanetary Society, British Interplanetary Society, London, GB, vol. 45, Nr. 10, pp. 407–413 XP000300950.

Whitehouse, D.J., "Nanotechnology Instrumentation," Measurement and Control, Institute of Measurement and Control, Lond, GB, vol. 24, Nr. 2, pp. 37–46 XP000224361.

Drexler, K.E., "Building Molecular Machine Systems," Trends in Biotechnology, Elsevier, Amsterdam, NL, vol. 17, Nr. 1, pp. 5–7 XP004155526.

Merkle, R.C., "Biotechnology as a Route to Nanotechnology," Trendds in Biotechnology, Elsevier, Amsterdam, NL, vol. 17, Nr. 7, pp. 271–274 XP004169725.

Allan, R., "Nanotechnology: It's a Small World After All," Electronic Design, Penton Publishing, Cleveland, OH, US, vol. 47, Nr. 1, pp. 100–103 XP000889261.

Globus A., et al., "Aerospace Applications of Molecular Nanotechnology," Journal of the British Interplanetary Society, British Interplanetary Society, London, GB, vol. 51, Nr. 4, pp. 145–152 XP000741298.

(List continued on next page.)

Primary Examiner—Leo Picard
Assistant Examiner—Elliott Frank
(74) Attorney, Agent, or Firm—Fulbright & Jaworski L.L.P.

(57) ABSTRACT

A system and method which provide a non-biological self replicating manufacturing system ("SRMS") are disclosed. A preferred embodiment provides an SRMS that enables assembly stations to replicate. In a preferred embodiment, positional assembly is utilized by one or more assembly stations to construct like assembly stations. Furthermore, in a most preferred embodiment, such assembly stations are small scale devices that are capable of working with small scale parts, such as micron-scale, nanometer-scale or even molecular-scale parts, in order to construct like assembly devices. The SRMS of a preferred embodiment performs surface-to-surface assembly. For example, an assembly station on a first surface (e.g., wafer), Surface A, constructs a like assembly station on another surface (e.g., wafer), Surface B. Most preferably, the assembly stations replicate at an exponential rate.

109 Claims, 11 Drawing Sheets

OTHER PUBLICATIONS

A Proof About Molecular Bearings; Ralph C. Merkle, Feb. 4, 1993.
Automaton Introspection; Richard Laing, Apr. 5, 1976.
Automaton Models of Reproduction by Self–Inspection; Richard Laing, Jul. 13, 1976.
Convergent Assembly; Ralph C. Merkle, Mar. 1997.
Fluidic Self–Assembly of Microstructures and its Application to the Integration of GaAs on Si; Hsi–Jen J. Yeh and John S. Smith Jan. 1994.
How a SIMD Machine can Implement a Complex Cellular Automaton. A Case Study; Jacqueline Signorini, Aug. 1989.
Nanomachinery: Atomically Precise Gears and Bearings; K. Eric Drexler, Aug. 1987.
NASA and Self–Replicating Systems: Implications for Nanotechnology; Ralph C. Merkle Jun. 1990.
Scanning Tunneling Microscopy and Atomic Force Microscopy: Application to Biology and Technology; Hansma et al., Oct. 14, 1988.
Self–Assembling Electrical Networks: An Application of Micromachining Technology; Cohn et al, May 1991.
Self Replication and Nanotechnology; www.zyvex.com/nanotech.
Self Replicating Systems and Low Cost Manufafcturing; Ralph C. Merkle 1994.
Self Replicating Systems and Molecular Manufacturing; Ralph C. Merkle, 1992.
Some Alternative Reproductive Strategies in Artificial Molecular Machines; Richard Laing, Nov. 11, 1974.
Theoretical Studies of a Hydrogen Abstraction Tool for Nanotechnology; Musgrave et al. Apr. 22, 2992.

* cited by examiner

Surface B

Surface A

Surface B

Surface A

FIG. 7F

Surface B / Surface A

FIG. 7E

Surface B / Surface A

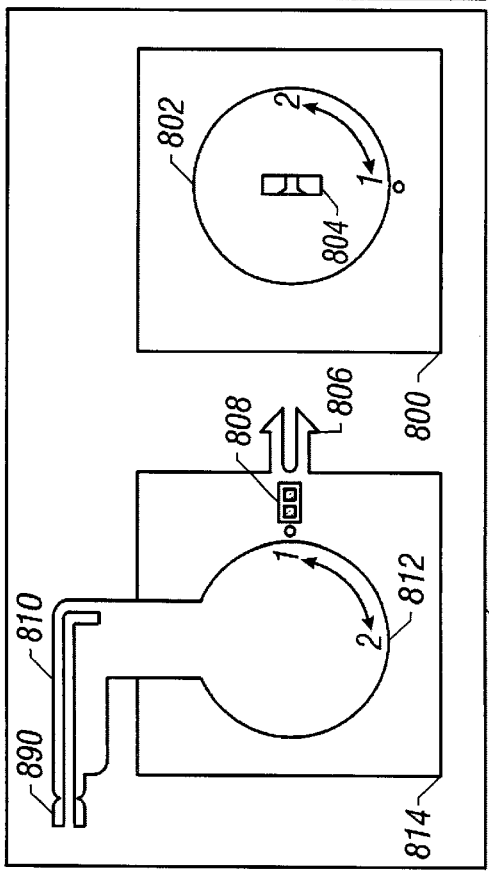
FIG. 8A
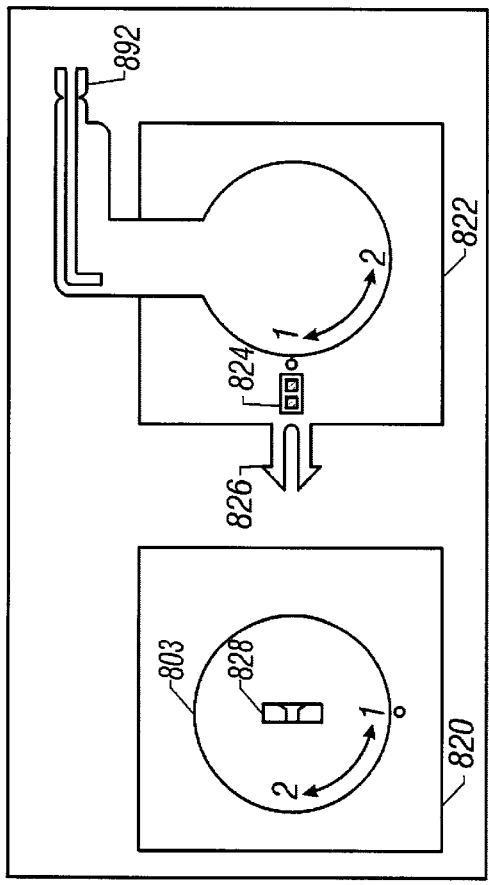
FIG. 8B
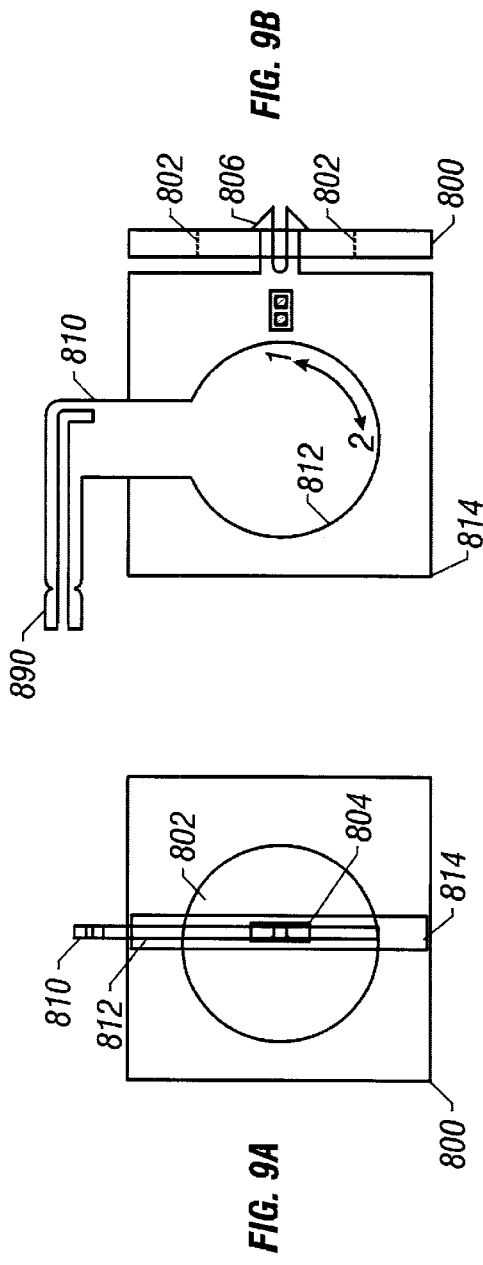
FIG. 9A
FIG. 9B

METHOD AND SYSTEM FOR SELF-REPLICATING MANUFACTURING STATIONS

RELATED APPLICATIONS

This application is related to concurrently filed and commonly assigned U.S. patent application Ser. No. 09/570,170 entitled "SYSTEM AND METHOD FOR COUPLING MICROCOMPONENTS," Ser. No. 09/569,329 entitled "GRIPPER AND COMPLEMENTARY HANDLE FOR USE WITH MICROCOMPONENTS," and," Ser. No. 09/569,328 entitled "RIBBON CABLE AND ELECTRICAL CONNECTOR FOR USE WITH MICROCOMPONENTS," the disclosures of which are hereby incorporated herein by reference.

TECHNICAL FIELD

This invention is related in general to manufacturing, and in particular to a non-biological self replicating manufacturing system.

BACKGROUND

A recognized desire exists in the prior art for non-biological self replicating manufacturing systems. Manufacturing systems are commonly implemented to produce (or manufacture) many types of non-biological items, including but not limited to commercial products (e.g., automobiles, clothing, appliances, computer components, etcetera), industrial products (e.g., parts used in industrial factories), and even information (e.g., data generated by a computer system). Various attempts and advances have been made in such non-biological manufacturing systems of the prior art to manufacture an end product in a timely and cost efficient manner. A relatively simple example of a prior art manufacturing advancement was the development of the assembly line in the early 1900's by Henry Ford to enable mass production of automobiles in a timely and cost efficient manner. Of course, numerous additional advances have been made in the field of manufacturing in attempts to further improve the timeliness and cost efficiency of various manufacturing systems.

While many such advancements have been made toward improving manufacturing systems' production of an end product, a desire has also been recognized for improving the development of the manufacturing systems themselves. For example, a desire has been recognized for improving the timeliness and cost efficiency associated with developing (or "manufacturing") a manufacturing system. For instance, a factory may be implemented with one or more assembly lines included therein to enable the factory to mass produce automobiles. However, a desire exists for manufacturing the factory itself (having the assembly lines therein) in a timely and cost efficient manner. Prior art theorists have long recognized the desirability of a non-biological self replicating manufacturing system. Such a self replicating system would first enable a manufacturing system to effectively replicate, resulting in additional like manufacturing systems. Thereafter, the manufacturing systems may all work to manufacture end products. As a result, the timeliness and cost efficiency of producing a manufacturing system, as well as end products, may be enhanced.

As a broad example of such a self replicating theory, further consider the above example of a factory that includes assembly lines for mass producing automobiles. If such a factory were a self replicating manufacturing system, then the factory itself could produce another like factory (i.e., replicate), and the two factories could then work in parallel to manufacture end products (e.g., automobiles). Of course this theory need not only be applied at the highest level of a manufacturing system (e.g., the factory itself), but could be applied to any level within a manufacturing system (e.g., to any manufacturing system included within the factory). For example, an assembly line included within the factory, if implemented as a self replicating assembly line, could replicate to efficiently generate a desired number of such assembly lines to be utilized within the factory.

Self replication is a desirable concept not only for large scale manufacturing systems, such as factories, but also for much smaller scale manufacturing systems. A particular need has been recognized for a non-biological self replicating manufacturing system in the field of nanotechnology. That is, a particular need has been recognized for a non-biological self replicating manufacturing system for micro-assembly and nano-assembly of end products. For example, due to the particular complexity and time requirements typically associated with nanotechnology manufacturing, a non-biological self replicating manufacturing system in this field is especially desirable. In the past few decades, theories have been proposed for providing self replicating manufacturing systems on various size scales, from very large manufacturing systems (e.g., see the Lunar Factory proposed by NASA and ASEE described below) to manufacturing systems that manufacture end products at the molecular level (e.g., see Drexler's Assembler described below).

One example of a proposed self replicating manufacturing system in space exploration is the Self-Replicating Lunar Factory proposed by the National Aeronautics and Space Administration (NASA) and the American Society for Engineering Education (ASEE) in 1980 (see *NASA Conference Publication 2255: Advanced Automation for Space Missions*, edited by Robert A. Freitas, Jr. and William P. Gilbreath, National Technical Information Service, U.S. Department of Commerce, Springfield, VA; N83-15348). This proposal describes a vastly complex self replicating system intended to self replicate within a relatively uncontrolled environment (i.e., the surface of the Earth's moon). More specifically, the resulting proposal included a 150-page chapter on "Replicating Systems Concepts: Self-Replicating Lunar Factory and Demonstration" which proposed a 20-year program to develop a self-replicating general purpose lunar manufacturing facility (a Self Replicating System, or SRS) that would be placed on the lunar surface. The initial "seed" for the facility, to be landed on the lunar surface from Earth to start the process, was 100 tons (approximately four Apollo missions). Once this 100-ton seed was in place, all further raw materials would be mined from the lunar surface and processed into the parts required to extend the SRS. A significant advantage of this approach for space exploration would be to reduce or eliminate the need to transport mass from the Earth—which is relatively expensive.

The report remarks that "[t]he difficulty of surmounting the Earth's gravitational potential makes it more efficient to consider sending information in preference to matter into space whenever possible. Once a small number of self-replicating facilities has been established in space, each able to feed upon nonterrestrial materials, further exports of mass from Earth will dwindle and eventually cease. The replicative feature is unique in its ability to grow, in situ, a vastly larger production facility than could reasonably be transported from Earth. Thus the time required to organize extraordinarily large amounts of mass in space and to set up and perform various ambitious future missions can be greatly shortened by using a self-replicating factory that expands to the desired manufacturing capacity." Accordingly, a large-scale, vastly complex, non-biological self replicating manufacturing system has been proposed in the prior art for operation within the relatively uncontrolled environment of the Earth's moon. While such a system has been proposed, it has yet to be implemented in a manner that supports the proposition that such a vastly complex system is workable/successful as a self replicating manufacturing system in such an uncontrolled environment. Without such an implementation, such a proposal appears speculative due to the enormous complexity involved, in addition to the relatively unpredictable nature of the uncontrolled environment in which the manufacturing system is proposed to be implemented.

Another example of a proposed non-biological self replicating manufacturing system is provided in the theoretical work of von Neumann (see *Theory of Self-Reproducing Automata*, by John von Neumann, edited and completed by Arthur W. Burks, University of Illinois Press, 1966). The von Neumann architecture for a self replicating system is perhaps the ancestral and archetypical proposal for non-biological self replicating manufacturing systems (see e.g. *How a SIMD machine can implement a complex cellular automaton?*[sic] *A case study: von Neumann's 29-state cellular automaton*, by Jacqueline Signorini, Proceedings Supercomputing '89, ACM Press, 1989). Von Neumann proposed two types of systems: (1) a cellular automata system and (2) a "kinematic machine."

Von Neumann's proposed self-replicating system consisted of two central elements: a Universal Computer and a Universal Constructor. The Universal Computer contains a program that directs the behavior of the Universal Constructor. The Universal Constructor, in turn, is used to manufacture both another Universal Computer and a Universal Constructor. Once constructed, the newly manufactured Universal Computer was programmed by copying the program contained in the original Universal Computer, and program execution would then begin on the newly manufactured Universal Computer.

Von Neumann worked out the details for a Constructor that worked in a theoretical two-dimensional cellular automata world, and parts of his proposal have since been modeled computationally (see *How a SIMD machine can implement a complex cellular automaton?*[sic] *A case study: von Neumann's 29-state cellular automaton*, by Jacqueline Signorini). The Constructor had an arm, which it could move about; and a tip, which could be used to change the state of the cell on which it rested. Thus, the proposal suggested that by progressively moving the arm and changing the state of the cell at the tip of the arm, it was possible to create "objects" that consisted of regions of the two-dimensional cellular automata world which were fully specified by the program that controlled the Constructor. Theoretically, one such "object" that could be created by the Constructor is a like Constructor and companion computer.

While this solution demonstrates the theoretical validity of the idea, von Neumann's kinematic constructor (which was not worked out in such detail) has had perhaps a greater influence, for it is a model of self replication which can more easily be adapted to the three-dimensional world in which we live. The kinematic constructor was a robotic arm which moved in three-space, and which grasped parts from a sea of parts around it. These parts were then assembled into another kinematic constructor and its associated control computer.

It should be noted that self replication, while important, is generally not a sole objective. A manufacturing device able to make copies of itself but unable to make anything else (or perform/satisfy some other task/function) would typically not be very valuable. Von Neumann's proposals are centered around the combination of a Universal Constructor, which could make anything it was directed to make, and a Universal Computer, which could compute anything it was directed to compute. This combination provides immense value, for it can be re-programmed to make any one of a wide range of things. It is this ability to make almost any structure that is generally desired, and to do so at low cost, which is generally considered to be of value. The ability of the device to make copies of itself is typically a means to achieve low cost, rather than an end in itself. Of course, it is not a requirement that a self replicating manufacturing system be capable of producing an end product other than a like manufacturing system in order to have value. For example, a chair that is capable of replicating (or "manufacturing") itself but unable to manufacture any other end product is still valuable in that the chair itself, once produced, serves a useful function (i.e., provides a suitable surface for sitting).

A more recent proposal for a non-biological self replicating system has been presented by Eric Drexler for an "assembler" (see *Nanosystems: molecular machinery, manufacturing, and computation*, by K. Eric Drexler, Wiley 1992). Drexler's assembler follows the von Neumann kinematic architecture, but is specialized for dealing with systems made of atoms. That is, the emphasis of Drexler's proposal (in contrast to von Neumann's proposal) is on small size, e.g., molecular scale systems. In Drexler's proposal, von Neumann's computer and constructor both shrink to the molecular scale, while the constructor takes on additional detail consistent with the desire to manipulate molecular structures with atomic precision.

The molecular constructor of Drexler's assembler has two major subsystems: (1) a positional capability and (2) the tip chemistry. The positional capability might be provided by one or more small robotic arms, or alternatively might be provided by any one of a wide range of devices that provide positional control (see e.g. *Robotic Engineering: an Integrated Approach*, by Richard D. Klafter, Thomas A. Chmielewski, and Michael Negin, Prentice Hall 1989). The emphasis, though, is on a positional device that is very small in scale: perhaps 0.1 microns (100 nanometers) or so in size. It should be understood, that in the field of nanotechnology, current Scanning Probe Microscope (SPM) designs typically employ piezoelectric elements for positional control (see e.g., *Scanning Tunneling Microscopy and Atomic Force Microscopy: Application to Biology and Technology*, by P. K. Hansma, V. B. Elings, O. Marti and C. E. Bracker, Science, Vol. 242, Oct. 14, 1988, pages 209–216). It has been recognized that, in general, it is more preferable to implement mechanical positioning systems having a large range of motion in relation to their overall size within a self replicating manufacturing system, in contrast to available piezoelectric or other electrostatic positioning devices having a small range of motion in relation to their overall size. In general, the reasons for such preference for mechanical positioning devices at the molecular scale are similar to the reasons that mechanical devices are commonly employed at the macroscopic scale: the desire for compactness, large range of motion relative to size, and high positional accuracy (e.g., high stiffness). These considerations weigh against electrostatic and piezoelectric devices. Molecular mechanical devices, on the other hand, can theoretically employ very stiff materials and, with appropriate design, can have joints that rotate easily but which at the same time provide high stiffness in other degrees of freedom (see e.g., *Nanomachinery: Atomically precise gears and bearings*, by K. Eric Drexler, in IEEE Micro Robots and Teleoperators Workshop, Hyannis, Cape Cod, November 1987; and *A Proof About Molecular Bearings*, by Ralph C. Merkle, Nanotechnology Volume 4, 1993, pages 86–90).

The tip chemistry in Drexler's proposal is logically similar to the ability of the von Neumann universal constructor to alter the state of a cell at the tip of the arm, but now the change in "state" corresponds to a real-world change in molecular structure. That is, a set of well-defined chemical reactions that take place at the tip of the arm must be specified, and this well-defined set must be sufficient to allow the synthesis of the class of structures of interest. Various methods for implementing such a "tip chemistry" have been proposed in the prior art. For example, Chemical Vapor Deposition (CVD) is often utilized for synthesizing diamond at a relatively low temperature and pressure. In this process a highly reactive low-pressure gas is passed over the growing diamond surface. The gas typically includes atomic hydrogen and various species of hydrocarbons. The growing diamond surface is usually terminated with hydrogen. A fairly common mechanism for growth involves (1) the abstraction of one or more hydrogen atoms from the surface, leaving one or more dangling bonds, followed by (2) reaction of the dangling bond(s) with a carbon containing species (e.g., $CH_3$, $C_2H_2$, etc). This cycle of abstraction and deposition may be repeated indefinitely.

However, to make an atomically precise diamondoid structure, it would typically be undesirable to rely on reactive molecules in a gas. A gas molecule can react with the surface at any location, and so the synthesis process is statistical and largely uncontrolled. To achieve atomically precise control over the product, highly precise positional control over the reactants is generally needed. One suggestion in the prior art is to mount a highly reactive molecule on the tip of a positional device. For example, hydrogen abstraction can take place when an atomic hydrogen in the reactive gas strikes a hydrogen bonded to the growing surface. In some cases, the result will be an H2 molecule leaving the surface and a dangling bond at the site where the H was removed. Unfortunately, atomic hydrogen is difficult to hold without making it inert. Bonded to the tip of a positional device, a hydrogen atom is non-reactive. If it is not bonded to some structure, then it is difficult to control its position with the required precision. Thus, the prior art has proposed a hydrogen abstraction tool which (a) has one end which is fairly stable, and so can be bonded into a larger "handle," and (b) has a highly reactive end that has a high affinity for hydrogen.

An example of such a prior art tool is the propynyl hydrogen abstraction tool illustrated in FIG. 1. In the exemplary theory of the prior art shown in FIG. 1, the carbon atom at the tip is triply bonded to the middle carbon atom, which is in turn singly bonded to the carbon atom at the base. The tip atom is a radical. If the tip atom were bonded to hydrogen, the resulting bond would be very strong: about 130 kcal/mole. Quantum chemical calculations strongly support the idea that this tool will be able to easily abstract hydrogen from most diamond surfaces, and in particular that the barrier to the abstraction will either be small or non-existent (see e.g., *Theoretical Studies of a Hydrogen Abstraction Tool for Nanotechnology*, by Charles B. Musgrave, Jason K. Perry, Ralph C. Merkle and William A. Goddard, III, Nanotechnology 2, 1991, pages 187–195). The base of the tool would be bonded into an extended diamondoid "handle" which could then be mechanically grasped and positioned. This tool could be used to remove hydrogen in a site-specific fashion from a diamondoid work-piece, thus setting the stage for a carbon deposition tool to bond one or more carbon atoms at that site. Once the tool had performed its task it could either be thrown out and a new tool created from an appropriate pre-cursor, or the tool could be "refreshed" by removal of the abstracted hydrogen atom.

Additionally, several proposals for carbon deposition tools have been made. The general idea, however, is to use tools which bond a gas-phase growth species to a positionally controlled tip, and then to employ a reaction mechanism similar to that which would occur for the gas-phase species during deposition on the surface. It is useful to note that positional control also provides a convenient and very controlled mechanism for providing the activation energy sometimes needed: it is possible to apply mechanical force (push). This option is not normally available in chemistry and so opens up a rich new set of reaction mechanisms.

The assembler, as proposed by Drexler, is not a specific device, but is instead a class of devices. Specific members of this class will deal with specific issues in specific ways. Accordingly, it has been suggested in the prior art, that to enable such an assembler as that proposed by Drexler, one is required to specify many details of such assembler (see *Self Replicating Systems and Molecular Manufacturing*, by Ralph C. Merkle, Journal of the British Interplanetary Society, Volume 45, 1992, pages 407–413). For example, to specify an assembler one needs to specify (1) the type and construction of the computer, (2) the type and construction of the positional device, (3) the set of chemical reactions that take place at the tip, (4) how compounds are transported to and from the tip, and how the compounds are modified (if at all) before reaching the tip, (5) the class of structures that can be built by the assembler, (6) the environment in which it operates, and (7) the method of providing power to the assembler. Additionally, it has been recognized that it is often desirable to be capable of transmitting instructions to the assembler. Therefore, an additional element may be required to be specified: (8) a receiver that allows the assembler to receive instructions (e.g., broadcast instructions, as discussed more fully below). Depending on the type of manufacturing system desired, as well as the environment in which such system is expected to function, additional characteristics may need to be specified for the assembler.

Another type of theoretical non-biological self replicating system, also proposed in the prior art, is Richard Laing's replication by inspection approach (see *Some Alternative Reproductive Strategies in Artificial Molecular Machines*, Journal of Theoretical Biology, Volume 54, 1975, pages 63–84; *Automation Introspection*, Journal of Computer System Science, Volume 13, 1976, pages 172–183; and *Automation Models of Reproduction by Self-Inspection*, Journal of Theoretical Biology, Volume 66, 1977, pages 437–456; by Richard A. Laing). This approach relies upon the ability, in von Neumann's kinematic model, of a machine to identify all parts of the system and thus to determine the type and location of all components. Thus for example, a replicating system may consist of two devices-one active, the other passive, but each capable of assuming passivity upon a signal from the active device. Beginning with two devices (not necessarily identical), one device inspects the second device and builds a duplicate of the second device. Then the second device inspects the first and builds a duplicate of it, the active and passive status of the two devices being exchanged. The result is that the two devices have replicated themselves, without either device being independently capable of self-replication, but also without either device possessing any explicit set of structural plans.

A further type of non-biological self replicating system has been proposed in the prior art, which utilizes a "broadcast architecture." In the von Neumann architecture and Drexler's assembler (and in living systems) the complete set of plans for the system are carried internally in some sort of memory. This is not a logical necessity in a self replicating manufacturing system. If the "constructor" is separated from the "computer," and many individual constructors are allowed to receive broadcast instructions from a single central computer then each constructor need not remember the plans for what it is going to construct: it can simply be told what to do as it does it. An example of such a broadcast architecture is illustrated logically in FIG. 2. As shown in FIG. 2, a central macroscopic computer 202 may be implemented, which broadcasts instructions to one or more molecular constructors 204. This approach not only eliminates the requirement for a central repository of plans within the constructor (which is now the component that self replicates), it can also eliminate almost all of the mechanisms involved in decoding and interpreting those plans. Advantages of such a broadcast architecture include: (1) it reduces the size and complexity of the self replicating component, (2) it allows the self replicating component to be rapidly redirected to build something novel, and (3) if the central computer is macroscopic and directly controllable, the broadcast architecture is inherently "safe" in that the individual constructors lack sufficient capability to function autonomously (e.g., prevents constructors from replicating on their own undesirably).

Various methods have been proposed for enabling such a "broadcast architecture." Drexler has proposed immersing the constructor in a liquid or gas capable of transmitting pressure changes and using pressure sensitive ratchets to control the motions of the constructor. If each pressure sensitive ratchet has a distinct pressure threshold (so that pressure transitions around the threshold cause the ratchet to cycle through a sequence of steps while pressure changes that remain about or below the threshold cause the ratchet to remain inoperative) then it is possible to address individual ratchets simply by adjusting the pressure of the surrounding fluid. This greatly reduces the complexity of the instruction decoding hardware. This general approach is similar to that taken in the Connection Machine (see *The Connection Machine*, by Daniel Hillis, MIT Press, 1986) in which a single complex central processor decodes and broadcasts instructions to a large number of very simple processors with limited memory and limited capabilities. Storing the program, decoding instructions, and other common activities are the responsibility of the single central processor; while the large number of small processors need only interpret a small set of very simple instructions. Thus, this "broadcast" approach may minimize the amount of memory required for each assembler. On the other hand, if the assembler were not able to receive broadcast instructions, then it would be necessary for each assembler to have sufficient on-board memory to remember (a) how to build a second assembler and (b) how to build some useful product (or perform some other useful task once it is completed). In this scenario, a single appropriately programmed "seed" assembler would then have to replicate itself, manufacturing a large number of similarly programmed copies of itself. Accordingly, such an approach is less economically desirable than a broadcast approach.

It is important to note that the particular focus herein is directed toward "non-biological" self replicating manufacturing systems (which may also be referred to herein as "general manufacturing systems"). Many biological systems are available that are capable of self replication (e.g., human beings, etcetera). Such biological systems commonly include the ability for self replication. However, non-biological manufacturing systems (e.g., factories) are typically unable to self replicate. Many differences have been noted in the prior art between non-biological self replicating manufacturing systems, to which the present application is directed, and biological systems. While a non-biological self replicating system may be implemented in a manner that models (or simulates) a biological system, non-biological self replicating systems remain very different than a biological system. For example, just as an airplane is modeled in some respects after a bird, while remaining much different than a bird, a non-biological self replicating system may model a biological system but remain very different than a biological system.

While the benefits of implementing a self-replicating manufacturing system have been long recognized (see e.g., *There's Plenty of Room at the Bottom*, by Richard P. Feynman, Caltech's Engineering and Science, February 1960, which recognizes a desire for a set of slave "hands" that are somehow operable to manufacture smaller copies of such "hands"), little advancement has been made beyond the above prior art theories that have been proposed. That is, beyond the theories proposed for non-biological self replicating systems, little advance has been made in the prior art toward implementation of a non-biological self replicating system, particularly within the field of nanotechnology. Micro-assembly manufacturing stations of the prior art are typically developed one at a time by an outside manufacturing source (i.e., are not self-replicating). Furthermore, prior art micro-assembly manufacturing stations are typically manufactured either sequentially or in parallel with one another. One problem in prior manufacturing techniques is that generally an essential component of building more manufacturing systems is human involvement. People are commonly required to perform one or more critical operation(s) in the micro-assembly of a manufacturing station.

One example of a massively parallel technique commonly utilized in prior art micro-mechanical or micro-electrical manufacturing is that of lithography. Lithography is a well-known manufacturing technique that is very parallel in nature in that it may be utilized to process millions of devices simultaneously, but it is a technique which is not self replicating. Lithography is external to the manufactured parts themselves, e.g., the parts manufactured using lithography are not capable of further lithography of like parts. Thus, while lithography enables massive parallelism in manufacturing components, it does not enable self replication. Various manufacturing techniques have been developed in the prior art to enable massive parallelism in the manufacture of such parts; however, a successful self replicating manufacturing system for micro-assembled parts has not been developed in the prior art. While massive parallelism in manufacturing generally increases the efficiency of the manufacturing system beyond sequential manufacturing, parallel manufacturing does not achieve the level of efficiency that may be achieved through self replication of a manufacturing system.

A non-biological self replicating manufacturing system is desirable for many reasons. First, self replication is an effective route to truly low cost manufacturing. Furthermore, self replication may enable manufacturing to be accomplished in a timely manner, e.g., decrease the overall time required to manufacture a resulting product. Additionally, self replication may enable a precise manufacturing process having a small rate of error. For example, self replication can all but eliminate the presence of "human error" (or other "outside manufacturing source" error) that is commonly introduced into the manufacturing process.

SUMMARY OF THE INVENTION

In view of the above, a desire exists for a non-biological self replicating manufacturing system. A particular desire exists for a non-biological self replicating manufacturing system for performing small scale assembly, such as micron-scale and nanometer-scale assembly. A further desire exists for a non-biological self replicating manufacturing system that enables many assembly stations to be constructed in an efficient manner.

These and other objects, features and technical advantages are achieved by a system and method which provide a non-biological self replicating manufacturing system ("SRMS"). A preferred embodiment provides an SRMS that enables assembly stations to replicate (i.e., construct like assembly stations). In a preferred embodiment, positional assembly is utilized by one or more assembly stations to construct like assembly stations. Furthermore, in a most preferred embodiment, such assembly stations are small scale devices that are capable of working with small scale parts in order to construct like assembly devices. For example, such assembly stations may be micron-scale devices that are capable of constructing like assembly devices from micron-scale parts. Of course, in alternative embodiments such assembly stations may be larger scale devices.

A preferred embodiment provides an SRMS in which surface-to-surface assembly is performed. That is, an assembly station on a first surface, Surface A, constructs a like assembly station on another surface, Surface B. Such construction is preferably accomplished through positional assembly. Accordingly, the parts necessary to construct a like assembly station are prearranged in an accurate manner (within some acceptable degree of positional error) on Surface B, and are presented to the assembly station of Surface A. For example, each surface may be a wafer that contains one or more die sites on which the necessary parts are prearranged. In a preferred embodiment, the two surfaces are handled by a translating machine of the SRMS, which positions the assembly station of Surface A across from the parts of Surface B. Instructions are then sent (e.g., from a control computer) to the assembly station to cause the assembly station to construct a like assembly station from the prearranged parts on Surface B. Accordingly, a preferred embodiment provides an SRMS in which one or more assembly stations may be constructed by a like assembly station.

In a most preferred embodiment the SRMS is implemented such that the construction of like assembly stations (i.e., the replication of assembly stations) is accomplished in an efficient manner. For example, parts necessary for constructing assembly stations may be included on both Surface A and Surface B, and assembly stations on each surface may construct like assembly stations on the other surface. For instance, assembly stations on Surface A may construct like assembly stations on Surface B, while assembly stations on Surface B may construct like assembly stations on Surface A. Such construction may be performed in a ping-pong manner between the two surfaces. Alternatively, such construction may be performed in parallel on the surfaces, wherein assembly stations on Surface A construct like assembly stations on Surface B while assembly stations on Surface B simultaneously construct like assembly stations on Surface A. Various other assembly processes may be implemented in the SRMS of a preferred embodiment. Most preferably, the assembly stations replicate at an exponential rate. For instance, in one embodiment the assembly stations replicate according to a Fibonacci sequence. In another embodiment the assembly stations replicate exponentially in a manner such that n replication iterations result in assembly stations on the order of $2^n$, i.e., "$O(2^n)$" assembly stations.

Accordingly, in a most preferred embodiment, once one or more assembly stations are constructed, such assembly stations may be presented the necessary parts and instructions to self replicate. Additionally, once one or more assembly stations are constructed, such assembly stations are most preferably capable of performing at least one other task (beyond self replicating). For example, in a most preferred embodiment, such one or more assembly stations may be presented with the necessary parts and instructions to enable such assembly stations to assemble a different device (e.g., a non-like device) or perform some other function.

It should be understood that a preferred embodiment may provide a general manufacturing system that is capable of assembling a specific manufacturing system. Such specific manufacturing system may be identical to the general manufacturing system (i.e., may in effect be another "general manufacturing system"), or it may be different from the general manufacturing system. For example, the SRMS of a preferred embodiment may be implemented to enable multi-generational growth of assembly stations, in which a first generation of assembly station(s) assemble a second (or "later") generation of assembly stations. Thereafter, such later generation of assembly stations may further assemble even later generation of assembly stations, and so on. It should be understood that the assembly stations of each generation may be identical. However, in some implementations the assembly stations of each generation may be "like" assembly stations that are not necessarily identical. For example, the size of one or more generations of assembly stations may differ from that of the earlier generations. For instance, a first generation may assemble a second generation of assembly stations that are downscaled or upscaled from the first generation. As another example, the assembly stations of one or more later generations may be completely different than the earlier generations of assembly stations.

Furthermore, it should be recognized that each assembly station may actually comprise multiple assembly stations (or "sub-assembly stations"), which each assemble a portion of another assembly station. For instance, a first assembly station may comprise two sub-assembly stations, A and B. Sub-assembly station A may function to assemble a subassembly station B on a facing surface, and sub-assembly station B may function to assemble a sub-assembly station A on such facing surface, thereby resulting in a second assembly station that comprises sub-assembly stations A and B. For example, an SRMS may consist of a set of two or more assembly stations of non-like types which may cooperatively replicate a similar set using a sequence of surface-to-surface manufacturing operations, a process which may be called non-singlet replication. By way of illustration, and without intending to preclude other implementations from the scope of the present invention, consider a set consisting of an assembly station of type A and a second assembly station of type B. The initial stations A and B may be manually constructed (e.g., hand-built). On an opposing surface, station A may then construct 50% of a "daughter station" A, while station B constructs a different 50% of daughter station B. Thereafter, station B may be used to construct the remaining 50% of daughter station A, while station A constructs the remaining 50% of daughter station B, thereby completing the construction of both daughter assembly stations. Thus in non-singlet replication, assembly stations A and B might not be able independently to self-replicate, but the set (consisting of A plus B) can self-replicate additional like sets exponentially.

Thus, a most preferred embodiment provides a manufacturing system that utilizes surface-to-surface assembly. Furthermore, such manufacturing system may perform the surface-to-surface assembly in a parallel manner (e.g., more than one surface-to-surface assembly may be performed simultaneously). Further still, such a surface-to-surface assembly may be implemented in a ping-pong manner to construct assembly stations on two or more surfaces in an efficient manner. Additionally, a most preferred embodiment provides such a surface-to-surface assembly that may be implemented for small scale assembly (e.g., assembly on the micron scale). It should also be noted that a most preferred embodiment implements one or more surfaces, which may each comprise one or more assembly stations thereon, such that common translational movements are utilized for such one or more surfaces, thereby enabling the one or more assembly stations thereon to be simultaneously translated in a common manner. A most preferred embodiment enables surface-to-surface manufacturing to be extended to three dimensions by stacking multiple surfaces (or "work areas"). As discussed in greater detail below, a preferred embodiment provides a positional assembly manufacturing system that presents appropriate parts prearranged on wafers (or some other type of surface-mounted parts holders) to an assembly station, which then assembles the parts on the wafer (or other surface). Further still, in a most preferred embodiment such parts may be micron-scale parts (e.g., MEMS parts produced using lithographic, integrated-circuit based production methods). In a most preferred embodiment, a manufacturing station having two degrees of rotational freedom (referred to herein as a "MS2R"), as described herein, is implemented as the assembly station within the SRMS. However, in alternative embodiments, any type of assembly station capable of self replication may be implemented within the SRMS.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIGS. 7A–7H show an exemplary manufacturing process of a most preferred embodiment which enables assembly stations to replicate at an exponential rate;

FIG. 8A shows one implementation of components that may be assembled into an assembly station, which is referred to herein as a MS2R, that may utilized in a most preferred embodiment;

FIG. 8B shows one implementation of components that may be assembled into an MS2R assembly station by the MS2R constructed from components of FIG. 8A;

FIG. 9A shows an exemplary topview of a MS2R having "gripped" a part for constructing a like assembly station;

FIG. 9B shows an exemplary side view of MS2R having "gripped" a part for constructing a like assembly station;

DETAILED DESCRIPTION

I. Overview

Figure 1:
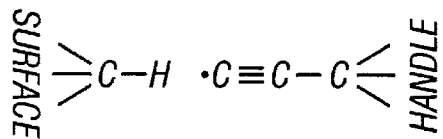
FIG. 1 shows an exemplary hydrogen abstraction tool of the prior art.
Figure 2:
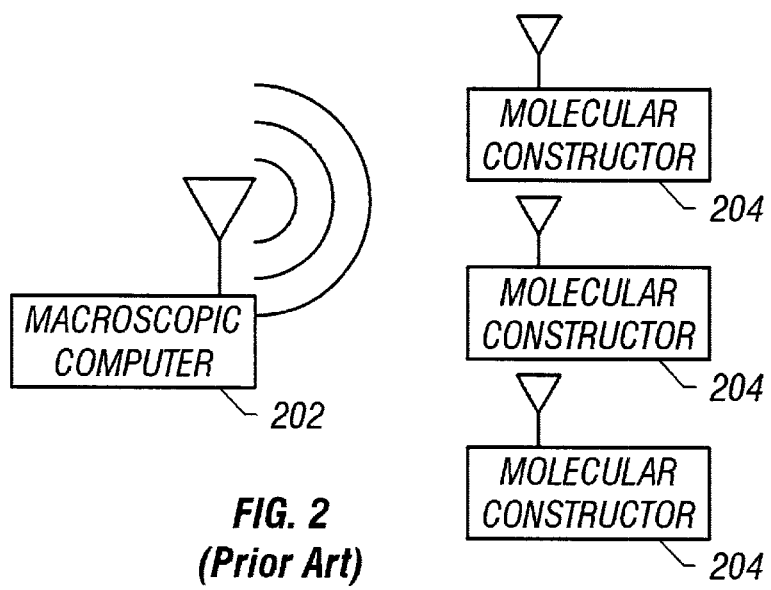
FIG. 2 shows an exemplary logical illustration of a broadcast architecture.

A preferred embodiment of the present invention utilizes positional assembly techniques to enable a non-biological self replicating manufacturing system ("SRMS"). In a most preferred embodiment, such a non-biological SRMS utilizes micron-scale or nano-scale parts in performing self replication. However, alternative embodiments may be implemented to enable SRMS for any size scale, and any such embodiments are intended to be within the scope of the present invention. As will be discussed in greater detail hereafter, a most preferred embodiment applies dead reckoning pick and place operations to parts, thus greatly simplifying the design of the manufacturing system and permitting simultaneous manufacture by many devices operating in parallel from very simple instructions.

As is well known in the art, the lithographically-based processes, by their nature, are planar. As a consequence, the self replication of a most preferred embodiment is also planar. As will be discussed in greater detail hereafter, in a most preferred embodiment, an assembly station (e.g., robotic arm) mounted on a surface, which may also be referred to herein as a "work area," can manufacture a copy of itself on a facing surface (or "facing work area"). For example, suppose a robotic arm is made from lithographic components and further suppose that a surface is presented facing the robotic arm, wherein such a facing surface is a wafer having the appropriate lithographic components needed to assemble a like robotic arm pre-positioned on its surface. The robotic arm can pick up the components provided that it can "grab" (or "grip") such components even when located with some modest positional error (typically on the order of one or two microns for the lithographic processes currently being used, but this error may be scaled with the accuracy of the process). Recent development of appropriate grippers and complementary attachmnent points (e.g., "handles"), such as those disclosed in concurrently filed and commonly assigned U.S. patent applicaiton Ser. No. 09/569,329 entitled "GRIPPER AND COMPLEMENTARY HANDLE FOR USE WITH MICROCOMPONENTS," the disclosure of which are hereby incorporated herein by reference, may be implemented to aid in enabling such a robotic arm to "grip" pre-positioned components (or parts) in the face of some acceptable positional error. Given that such an assembly station can "grip" the necessary parts, the assembly station can assemble the parts presented to it into a like assembly station provided that the assembly station is capable of receiving (and performing) necessary instructions for performing such an assembly. As a result, positional assembly can be utilized to achieve self replication of the assembly station even for very small scale assembly, such as micron-scale or nanometer-scale assembly.

Furthermore, a most preferred embodiment utilizes dead reckoning positional assembly ("DRPA"), i.e., no feedback positional assembly. The assembly process of a most preferred embodiment is implemented in a manner that self-corrects minor positional errors (e.g., parts on a facing surface being positioned on the surface incorrectly), thereby preventing the gradual accumulation of errors resulting from such minor positional errors. For example, the manufacturing system of a most preferred embodiment utilizes self-aligning mechanisms ("SAMs") to correct the position of incorrectly positioned parts and prevent the gradual accumulation of error in position. For instance, "grippers" and/or "handles," such as those disclosed in concurrently filed commonly assigned U.S. application Ser. No. 09/569,329 entitled "GRIPPER AND COMPLEMENTARY HANDLE FOR USE WITH MICROCOMPONENTS" may be implemented within the manufacturing system of a most preferred embodiment to enable the manufacturing system to self-correct minor positional errors of the parts to be assembled. As a result, DRPA operation is enabled for the assembly process of a most preferred embodiment. Such DRPA operation of a most preferred embodiment may further reduce the design complexity of the manufacturing system, as opposed to a manufacturing system that requires extensive feedback information to control the assembly of parts. Of course, it should be recognized that in alternative embodiments the SRMS may be implemented having feedback information from an assembly station to a control station (e.g., a control computer), and any such embodiment is intended to be within the scope of the present invention.

As will be discussed in greater detail below, a most preferred embodiment provides a manufacturing system that includes an assembly station capable of performing microassembly on a facing surface having the necessary parts prearranged thereon such that the assembly station is operable to assemble a like assembly station (i.e., self replicate). For instance, such an assembly station may comprise a single robotic arm capable of executing a fixed sequence of movements to assemble a second robotic arm on a facing surface from prearranged (or pre-positioned) parts included on such facing surface. It should be recognized that such an SRMS enables for the assembly stations to be replicated in an efficient manner. For example, in one implementation of a most preferred embodiment the SRMS enables assembly stations to self replicate exponentially. For instance, once a first assembly station (e.g., that includes a robotic arm) manufactures a second like assembly station on a second surface (e.g., on a facing surface), then both of the completed assembly stations can work in parallel to manufacture further assembly stations. It should be understood that this process may be implemented exponentially, e.g., the two aforementioned stations now working in parallel produce two more stations, these in turn produce four more, which then produce eight more, etcetera. As all assembly stations may operate synchronously (or in parallel), the time required for each doubling of the number of assembly stations is fixed (e.g., is the equivalent of the construction time for a single assembly station).

Furthermore, a most preferred embodiment may implement two (or more) surfaces that are arranged to enable a "ping-pong" mode of replicating assembly stations. For example, a first assembly station on a first surface may manufacture a like assembly station on a second (e.g., facing) surface. Thereafter, the second assembly station on the second surface may manufacture a third assembly station on the first surface. Thereafter, the two assembly stations on the first surface may make two additional assembly stations on the second surface. This process can be continued, with the number of robotic arms on each surface increasing, for example, in a Fibonacci sequence (which is a type of exponential increase). Therefore, such a ping-pong mode may enable assembly station(s) of one surface to assemble one or more assembly stations on a second surface, while also enabling assembly station(s) of such second surface to assemble one or more assembly stations on the first surface. Such a ping-pong design may further improve the efficiency and rate of increasing the number of assembly stations within the SRMS of a preferred embodiment.

Moreover, a most preferred embodiment may implement two (or more) surfaces that are arranged to enable a "parallel" mode of replicating assembly stations. For example, a first assembly station on a first surface may manufacture a like assembly station on a second (e.g., facing) surface. Thereafter, the second assembly station on the second surface may manufacture a third assembly station on the first surface. Of course, the first assembly station may, in parallel, manufacture a fourth assembly station on the second surface. Thereafter, the two assembly stations on the first surface may make two additional assembly stations on the second surface. Of course, the two assembly stations on the second surface may, in parallel, make two additional assembly stations on the first surface. This process can be continued, with the number of robotic arms on each surface increasing exponentially. Therefore, such a parallel mode may enable assembly station(s) of one surface to assemble one or more assembly stations on a second surface, while also enabling assembly station(s) of such second surface to simultaneously assemble one or more assembly stations on the first surface. Such a parallel implementation may further improve the efficiency and rate of increasing the number of assembly stations within the SRMS of a preferred embodiment.

In a most preferred embodiment many assembly stations may be assembled on each surface. Furthermore, in a most preferred embodiment the entire surface can be moved (or repositioned) in X, Y and Z directions (i.e., in three-dimensions). For example, in a most preferred embodiment, a portion of the manufacturing system external to the surfaces may provide common translational movements for the surfaces contained within the manufacturing system. More specifically, a translation machine included within the manufacturing system may provide smooth and accurate movement for a surface (i.e., to translate such surface), thereby allowing all assembly stations on such surface to be translated to a desired position simultaneously. For example, two surfaces may be presented facing each other such that assembly station(s) on one surface assemble assembly station(s) on the facing surface. To aid in such assembly operations, either surface or both surfaces may be translated, thereby simultaneously translating all of the assembly stations on such surfaces in a like manner. This eliminates the need for individual X, Y and Z positioning capabilities to be included in the individual assembly stations on the surface. Rather, in a most preferred embodiment, each assembly station need only provide rotational degrees of freedom.

For example, one implementation of a most preferred embodiment utilizes an assembly station referred to herein as a MS2R. The MS2R implementation illustrates that an assembly station having only two degrees of rotational freedom is sufficient to permit construction of a like work station having two degrees of rotational freedom on a facing surface. As designing and manufacturing a positional device having only two degrees of rotational freedom is easier than required for a more complex device having more degrees of rotational and/or translational freedom, and as the rotational degrees of freedom can be "clamped" during translational (X, Y or Z) movements, an assembly station such as the MS2R may provide a much simpler assembly station than a more general device having a greater number of degrees of freedom.

Furthermore, in one implementation of a preferred embodiment, multiple surfaces can be stacked. For example, after having made one surface covered with assembly stations, the manufacturing system can assemble a second surface. Thereafter, these two surfaces can be stacked into a single mechanical unit. Furthermore, once the two surfaces are stacked, all translational (X, Y and Z) movements within the manufacturing system may be common to both of the stacked surfaces. As a result, two more surfaces can be manufactured simultaneously in a most preferred embodiment, resulting in four completed surfaces (all having assembly stations thereon). These four surfaces can then be stacked into a single mechanical unit, and so on. Eventually, a convenient stack of many surfaces having assembly stations thereon may be produced, which can manufacture further like assembly stations on a second set of stacked surfaces simultaneously.

Accordingly, in a most preferred embodiment, once one or more assembly stations are constructed, such assembly stations may be presented the necessary parts and instructions to self replicate. Additionally, once one or more assembly stations are constructed, such assembly stations are most preferably capable of performing at least one other task (beyond self replicating). For example, in a most preferred embodiment, such one or more assembly stations may be presented with the necessary parts and instructions to enable such assembly stations to assemble a different device (e.g., a non-like device) or perform some other function.

Thus, a most preferred embodiment provides a manufacturing system that utilizes surface-to-surface assembly. Furthermore, such manufacturing system may perform the surface-to-surface assembly in a parallel manner (e.g., more than one surface-to-surface assembly may be performed simultaneously). Further still, such a surface-to-surface assembly may be implemented in a ping-pong manner to construct assembly stations on two or more surfaces in an efficient manner. Additionally, a most preferred embodiment provides such a surface-to-surface assembly that may be implemented for small scale assembly (e.g., assembly on the micron or submicron scale). It should also be noted that a most preferred embodiment implements one or more surfaces, which may each comprise one or more assembly stations thereon, such that common translational movements are utilized for such one or more surfaces, thereby enabling the one or more assembly stations thereon to be simultaneously translated in a common manner. A most preferred embodiment enables surface-to-surface manufacturing to be extended to three dimensions by stacking multiple surfaces (or "work areas"). As discussed in greater detail below, a preferred embodiment provides a positional assembly manufacturing system that presents appropriate parts prearranged on wafers (or some other type of surface-mounted parts holders) to an assembly station, which then assembles the parts on the wafer (or other surface). Further still, in a most preferred embodiment such parts may be micron-scale or nanometer-scale parts. Moreover, as will be discussed in greater detail hereafter, the SRMS of a preferred embodiment may be implemented to enable multi-generational growth of assembly stations. Also, the SRMS of a preferred embodiment may be implemented such that each generation of assembly stations are identical, or it may be implemented such that one or more generations of assembly stations are different from other generations.

II. Implementation of a Preferred Embodiment

Figure 3A:
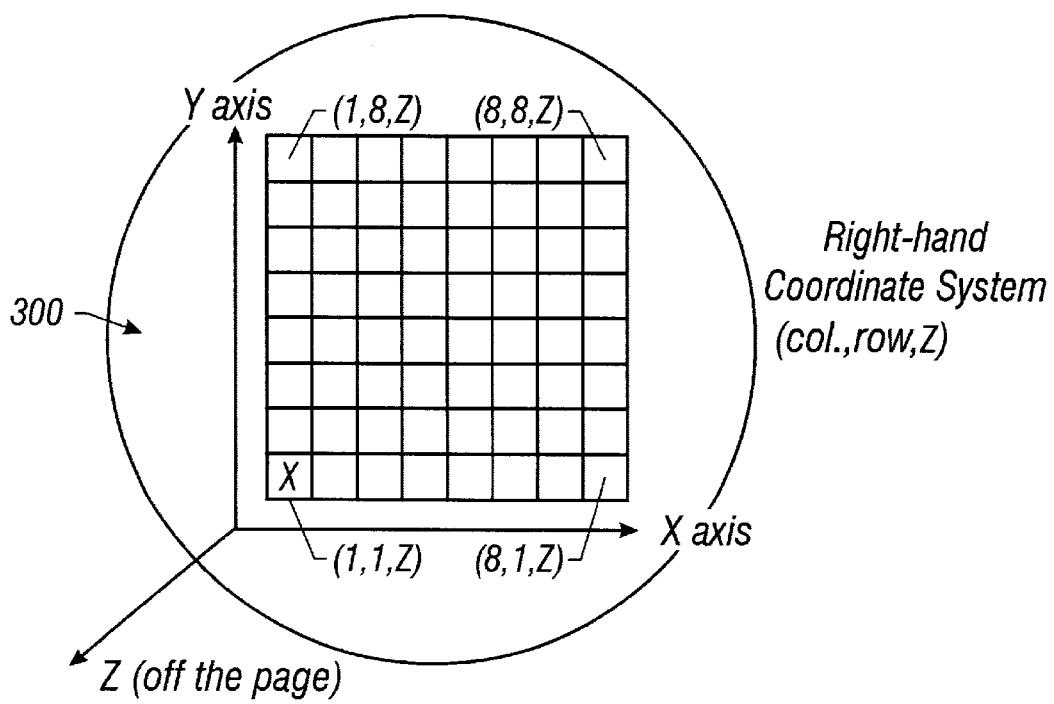
FIG. 3A shows an exemplary surface that may be utilized in an SRMS of a preferred embodiment.
Figure 3B:
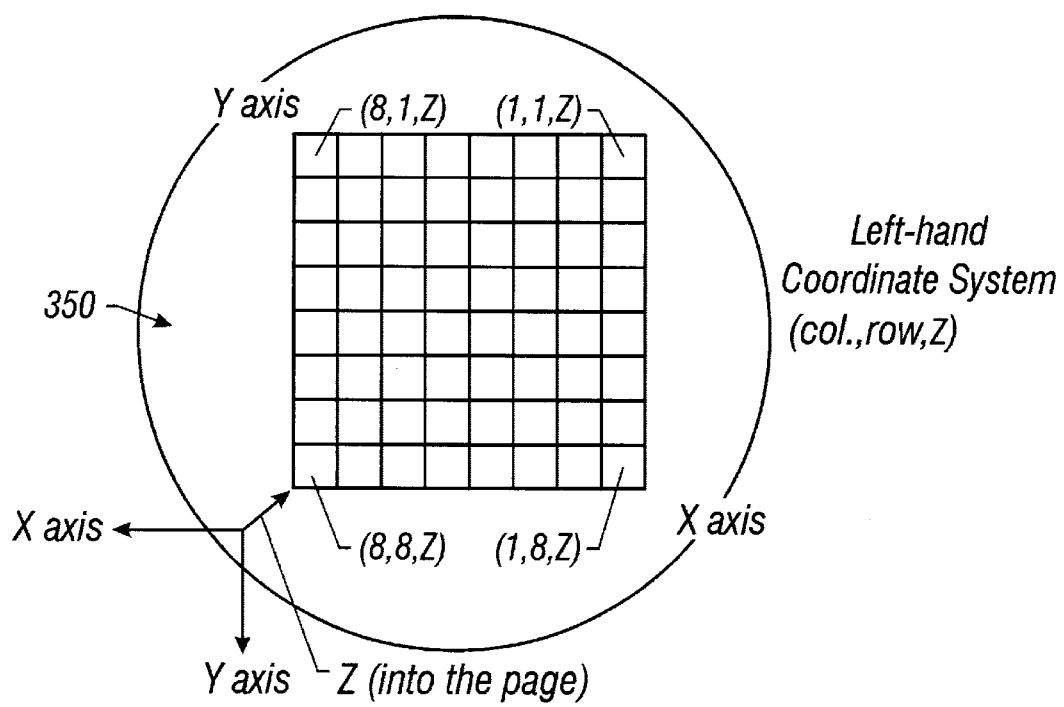
FIG. 3B shows a second exemplary surface that may be utilized in an SRMS of a preferred embodiment, which has a mirrored coordinate system to that of FIG. 3A.

As discussed above, a preferred embodiment provides an SRMS that utilizes positional, surface-to-surface assembly. Exemplary surfaces that may be utilized in an SRMS of a preferred embodiment are illustrated in FIGS. 3A and 3B. Turning to FIG. 3A, a wafer 300 is organized as an array of substantially identical "die sites." As an example, wafer 300 may be organized into an 8 by 8 array (or grid) of die sites ("dice"), wherein each die site is 1 centimeter (cm) by 1 cm. Of course, wafer 300 may, in alternative implementations, include any number of dice, each having any size, and any such implementation is intended to be within the scope of the present invention. The front side of the exemplary wafer 300 is shown in FIG. 3A. Each dice may be uniquely addressed by overlaying a right-handed Cartesian coordinate system. In such a coordinate system each dice is addressed as (column, row, "Z"), wherein "Z" is the distance or height off of the surface (e.g., the distance above the surface). Accordingly, the lower left dice has address (1, 1, Z), the lower right dice has address (8, 1, Z), the upper left dice has address (1, 8, Z), and the upper right dice has address (8, 8, Z). It should be understood that the "Z" value may vary, thereby varying the distance between surface 300 and its facing surface (e.g., surface 350 of FIG. 3B).

Turning now to FIG. 3B, a second wafer 350 that may be arranged facing wafer 300 of FIG. 3A to enable surface-to-surface assembly between the two surfaces is shown. Wafer 350 is organized as an array of substantially identical "die sites," which may be substantially a mirror image of wafer 300. As an example, wafer 350 may be organized into an 8 by 8 array (or grid) of die sites ("dice"), wherein each die site is 1 centimeter (cm) by 1 cm. Of course, wafer 350 may, in alternative implementations, include any number of dice, each having any size, and any such implementation is intended to be within the scope of the present invention. The back side of exemplary wafer 350 is shown in FIG. 3B, the front side of which may be aligned with another wafer, such as wafer 300 of FIG. 3A. Each dice of wafer 350 may be uniquely addressed by overlaying a left-handed Cartesian coordinate system. In such a coordinate system each dice is addressed as (column, row, "Z"), wherein "Z" is the distance or height off of the surface (e.g., the distance above the surface). Accordingly, the lower left dice has address (8, 8, Z), the lower right dice has address (1, 8, Z), the upper left dice has address (8, 1, Z), and the upper right dice has address (1, 1, Z). It should be understood that the "Z" value may vary, thereby varying the distance between surface 350 and its facing surface (e.g., surface 300 of FIG. 3A). For simplicity, such a mirrored coordinate system will be used for explanation herein; although, it should be recognized that any type of coordinate system may be utilized for referring to the die sites of the surfaces in the SRMS.

Figure 10:
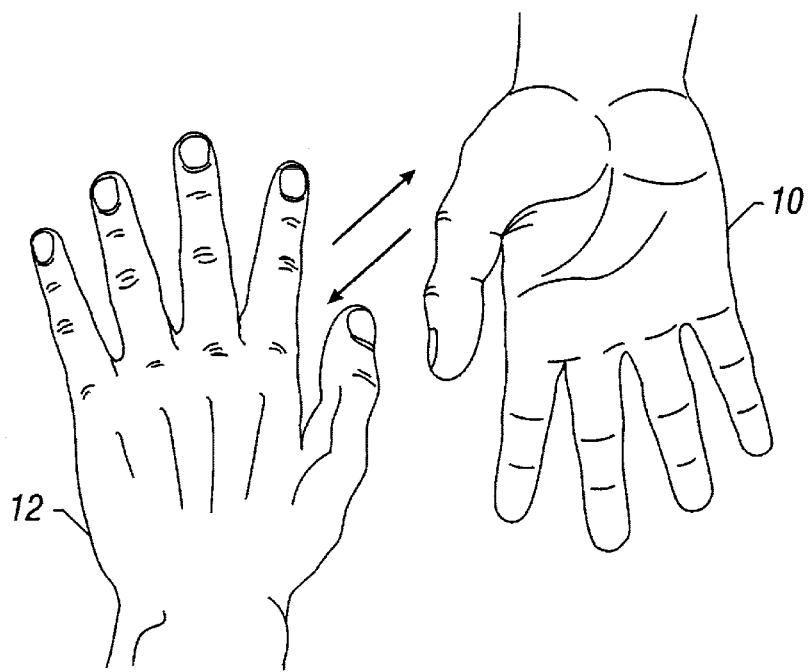
FIG. 10 shows an example of a mirrored coordinate system to illustrate one implementation for addressing die sites in a preferred embodiment.

Utilizing such a mirrored coordinate system for addressing the surfaces in the SRMS of a preferred embodiment enables identical instructions to be broadcast to the assembly stations on each surface. That is, the mirrored coordinate system aids in maintaining symmetry between the surfaces, which allows identical instructions to be broadcast to the assembly stations on each surface. Operation of a SRMS having such a mirrored coordinate system may be better understood with reference to the example illustrated in FIG. 10. FIG. 10 shows a pair of human hands arranged such that hand 10 overlays hand 12. Palms of hands 10 and 12 are facing each other, and the hands are positioned such that they are mirror images of each other. Thus, a movement of "X" amount of hand 10 in its thumb direction has the same effect as movement of "X" amount of hand 12 in its thumb direction. That is, the resulting position of the two hands with respect to each other will be the same whether hand 10 moves in its thumb direction "X" amount or hand 12 moves in its thumb direction "X" amount. Likewise, facing wafer surfaces may be implemented with such a mirrored coordinate system to enable a common set of assembly instructions to be executed by the assembly stations on each surface. For instance, an instruction to an assembly station to rotate "R" amount to its left may be executed by each assembly station on the opposing surfaces. Of course, it should be understood that alternative embodiments of a SRMS may be implemented such that the facing surfaces are not mirror images of each other and a different set of assembly instructions may be utilized for operation of the assembly stations on each surface, and any such implementation is intended to be within the scope of the present invention.

In a preferred embodiment, each site comprises all the parts required to construct a single assembly station in place. Additionally, the parts included within each site may be prearranged (or pre-positioned) into predetermined (or known) locations within each site. Furthermore, a control computer is provided within the SRMS of a preferred embodiment, which "knows" the location of each part as well as the assembly procedure (e.g., the moves/operations required to be performed by the assembly station to construct a like assembly station). Most preferably, such control computer is a central computer capable of controlling multiple assembly stations (e.g., via some type of broadcast architecture). Alternatively, such control computer may be associated with an individual assembly station to control only that assembly station's performance.

An example of one implementation of an SRMS is described broadly in conjunction with FIGS. 3–7 without reference to the exact configuration of the assembly station (s) that may be utilized therein. Thus, the SRMS of a most preferred embodiment, as described in conjunction with FIGS. 3–7, may be implemented with any type of assembly stations and to therefore it is first described without reference to an exact configuration of an assembly station that is utilized therein. That is, the SRMS of a most preferred embodiment is described without limitation as to the exact type of assembly station implemented therein. However, for completeness and to render the disclosure enabling for many different configurations of assembly stations, an exemplary configuration of an assembly station that may be utilized, which is referred to herein as a MS2R, is provided later herein.

Figure 4:
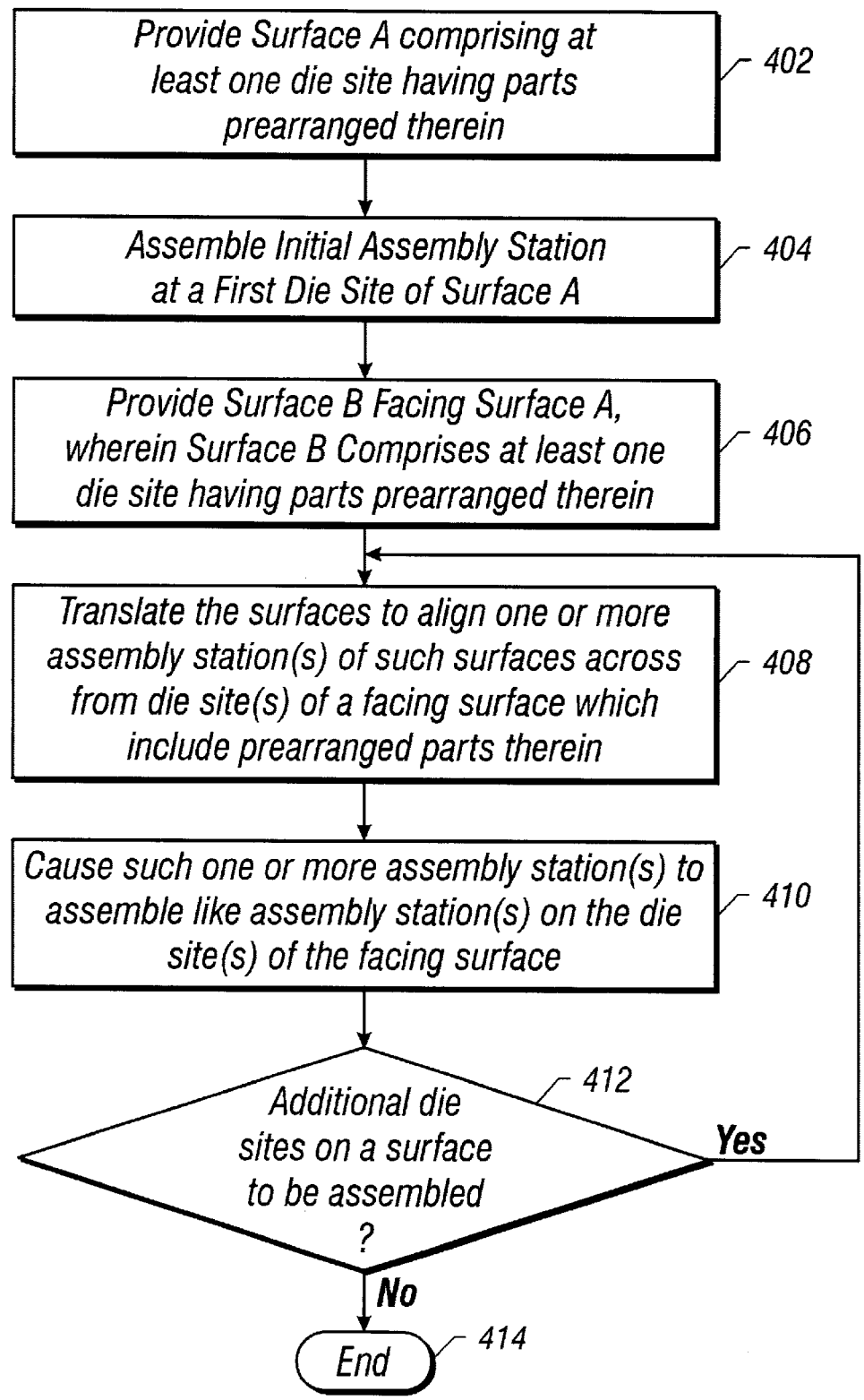
FIG. 4 shows an exemplary flow diagram for the manufacturing process of a most preferred embodiment.

Turning briefly to FIG. 4, an exemplary flow diagram is shown for the manufacturing process of a most preferred embodiment. As shown, in block 402, a first surface, Surface A, which comprises at least one die site having the appropriate parts for constructing an assembly station prearranged therein is provided to the SRMS. At block 404, an initial assembly station is assembled at a first die site of Surface A. Such an initial assembly is not a self replication operation. That is, the initial assembly station is not the result of a like assembly station replicating, but instead the initial assembly station is assembled by some other means. For instance, when constructing the initial assembly station, no other like assembly stations exist within the SRMS from which it may replicate. For example, the initial assembly station may be assembled manually by a human or computer controlled robot. Of course, if other like assembly stations pre-exist the assembly of this initial assembly station, then such other pre-existing like assembly stations may be utilized to assemble this initial assembly station. At block 406, a second surface, Surface B, is provided to the SRMS. Surface B comprises at least one die site having the appropriate parts for constructing an assembly station prearranged therein, and preferably Surface B is arranged facing Surface A.

At block 408, Surface A and/or Surface B are translated to align the assembly station of Surface A across from a die site having the appropriate prearranged parts for constructing a like assembly station. Once aligned, instructions are received by the assembly station (e.g., from a control computer via a broadcast architecture) on Surface A to cause such assembly station to assemble a like assembly station on the aligned die site of Surface B using the prearranged parts of such die site of Surface B. As will be discussed in greater detail herein, such assembly is most preferably a dead reckoning (i.e., no feedback), positional assembly. Such an assembly is preferably a positional assembly in that the assembly is dependant on the appropriate parts for construction being prearranged to within a minor positional error within the die site.

Once the assembly is complete, the process determines, at block 412, whether additional die sites that are to be constructed into assembly stations exist on either surface. If such die sites do exist, then the operation advances to block 408, wherein Surface A and/or Surface B are translated to align the now constructed assembly station(s) of Surface A and/or Surface B across from a die site of a facing surface having the appropriate prearranged parts for constructing a like assembly station. For example, the assembly station of Surface A may be aligned with a die site of Surface B that includes the appropriate prearranged parts for assembly of a like assembly station. Likewise, the assembly station now constructed on Surface B may be aligned with a die site of Surface A that includes the appropriate prearranged parts for assembly of a like assembly station. In fact, both of the constructed assembly stations may be aligned across from die sites having the appropriate prearranged parts for assembly of like assembly stations, such that the two assembly stations may operate in parallel to assemble additional assembly stations on their respective facing surfaces. Once aligned, instructions are received by the assembly station(s) to cause such assembly station(s) to construct a like assembly station on the aligned die site of its respective facing surface using the prearranged parts of such die site.

The above procedure of aligning one or more assembly stations of one surface with one or more facing die sites for assembling like assembly stations on such die sites may be repeated any number of times. Once it is determined at block 412 that no additional sites to be constructed into assembly stations exist on either surface, then operation ends at block 414. It should be recognized that such a manufacturing process enables the production of assembly stations at an exponential rate. For example, as will be discussed in greater detail hereafter in conjunction with FIGS. 7A–7H, a single assembly station may produce another assembly station, resulting in two assembly stations; the two assembly stations may each produce another assembly station (in parallel), resulting in four assembly stations; the four assembly stations may each produce another assembly station (in parallel), resulting in eight assembly stations; and so on. Furthermore, such an exponential growth may be accomplished in a ping-pong manner between two or more surfaces by utilizing the surface-to-surface assembly of a preferred embodiment. It should be recognized that while in theory such exponential growth of assembly stations may continue infinitely, in practice the exponential growth may be limited by the amount of resources available, as well as other factors. Accordingly, the SRMS of a preferred embodiment may be implemented such that only a limited number of assembly stations are constructed at an exponential rate, and thereafter, the assembly stations may be constructed at a somewhat slower rate (e.g., a linear rate).

Figure 5:
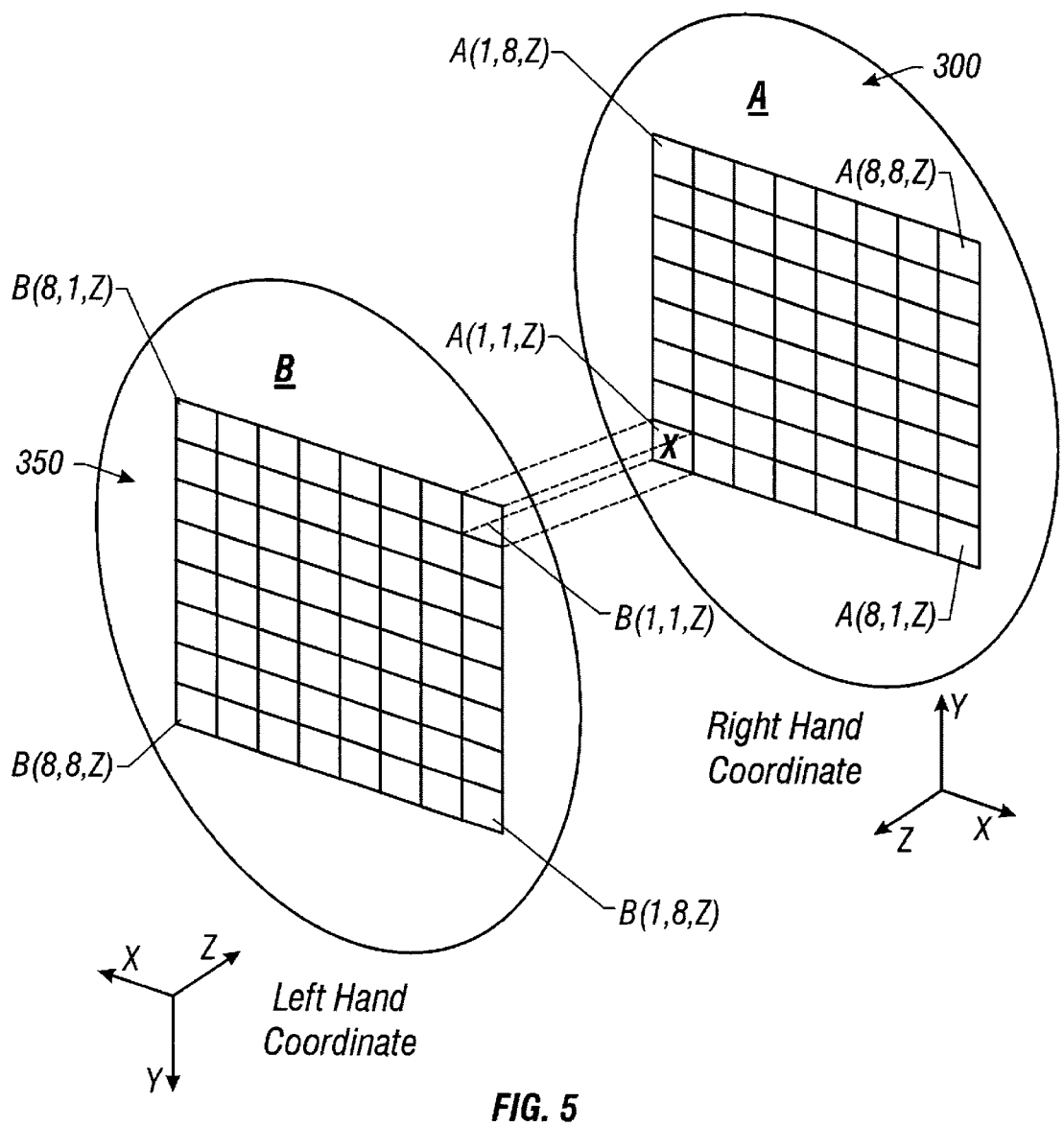
FIG. 5 shows exemplary surfaces arranged to allow self replication of assembly stations within the SRMS of a most preferred embodiment.

Turning to FIG. 5, the SRMS of a most preferred embodiment is shown in which surfaces A and B, shown as wafers 300 and 350, respectively, are provided. As indicated by an "X," an assembly station has been constructed on die site A(1, 1, Z) of wafer 300. Thus, wafer 300 comprises a single functioning assembly station, which is located at die site A(1, 1, Z). In a most preferred embodiment, wafer 300 is placed into a machine (which may be referred to as a "translation machine" or "positioning machine") with wafer 350 facing it, wherein wafer 350 is a mirror image of wafer 300. As shown, wafers 300 and 350 may be positioned such that the assembly station at die site A(1, 1, Z) is aligned across from die site B(1, 1, Z) of wafer 350. Wafers 300 and 350 are separated by some distance (e.g., "Z") that is reachable by the manipulators of the assembly station on wafer 300. As discussed above, in a most preferred embodiment wafer 350 is fabricated as a mirror image of wafer 300. Additionally, in a most preferred embodiment, wafer 350 is addressed with a left-handed coordinate system.

In a preferred embodiment, the translation machine is capable of translating wafer 300 and wafer 350 with respect to each other in one or more dimensions. For example, the translation machine may be capable of translating wafer 300 and wafer 350 with respect to each other along the X, Y and Z axes, which may form three of the degrees of freedom for each assembly station, thereby reducing the number of actuators required in the system. In a most preferred embodiment, dice A(1, 1, Z) is initially aligned across from dice B(1, 1, Z). The assembly process is then started, wherein a control computer sends the appropriate assembly instructions to the assembly station at dice A(1, 1, Z), and the assembly station of dice A(1, 1, Z) constructs a like assembly station at dice B(1, 1, Z). The assembly process accounts for the fact that surface B is a mirror image of surface A. Most preferably, connecting power to the assembly station of dice B(1, 1, Z) is the last step of the assembly process. Thereafter, a homing command may be executed which will home both assembly stations A(1, 1, Z) and B(1, 1, Z). That is, a homing command may be executed which will cause both assembly stations to move to a known configuration/position. For example, suppose each assembly station comprises a robotic arm. The homing command may cause each robotic arm to move to a known "home" position. Such a "home" position may, for example, be a position that is known to be safe during translation of the surfaces, so as to prevent such translation from damaging components, particularly components having a Z axis, of the assembly stations on such surfaces.

The translation machine may then position wafers 300 and 350 such that dice A(1, 1, Z) is across from dice B(2, 1, Z), which implies that the newly constructed assembly station at dice B(1, 1, Z) is across from dice A(2, 1, Z). Accordingly, the assembly station of B(1, 1, Z) is in the same relation to dice A(2, 1, Z) as the assembly station of A(1, 1, Z) is with respect to dice B(2, 1, Z). It should be recalled that in a preferred embodiment dice A(2, 1, Z) is a mirror image of dice B(1, 1, Z), so that the exact same assembly process will work for B(1, 1, Z) constructing an assembly station at dice A(2, 1, Z) as will work for assembly station A(1, 1, Z) constructing an assembly station at dice B(2, 1, Z). That is, the same assembly instructions can be executed in parallel to enable both assembly stations to construct like assembly stations on their respective facing die sites. The mirror coordinate system of a preferred embodiment enables such common instructions to be executed by the assembly stations of wafers 300 and 350. At the end of such assembly process by the assembly stations of die sites A(1, 1, Z) and B(1, 1, Z), four assembly stations are in existence. Again, the assembly process preferably ends with connection of power to the newly constructed assembly stations and execution of a homing command in parallel for the four assembly stations.

In a most preferred embodiment, the translation machine translates the surfaces such that the two assembly stations of each surface (A and B) are aligned with facing die sites on which like assembly stations are to be constructed. For example, the assembly stations of die sites A(2, 1, Z) and A(1, 1, Z) may be aligned with the die sites B(3, 1, Z) and B(4, 1, Z), respectively, which implies that the assembly stations of die sites B(2, 1, Z) and B(1, 1, Z) are aligned with the die sites A(3, 1, Z) and A(4, 1, Z), respectively. The assembly process may be performed in parallel by the assembly stations on their respective facing die sites, resulting in eight constructed assembly stations (i.e., four assembly stations on each surface). It should be recognized that after one more assembly iteration, each wafer 300 and 350 will have an entire row of assembly stations completed (which each comprise eight die sites in this exemplary implementation), as shown in FIG. 6.

Figure 6:
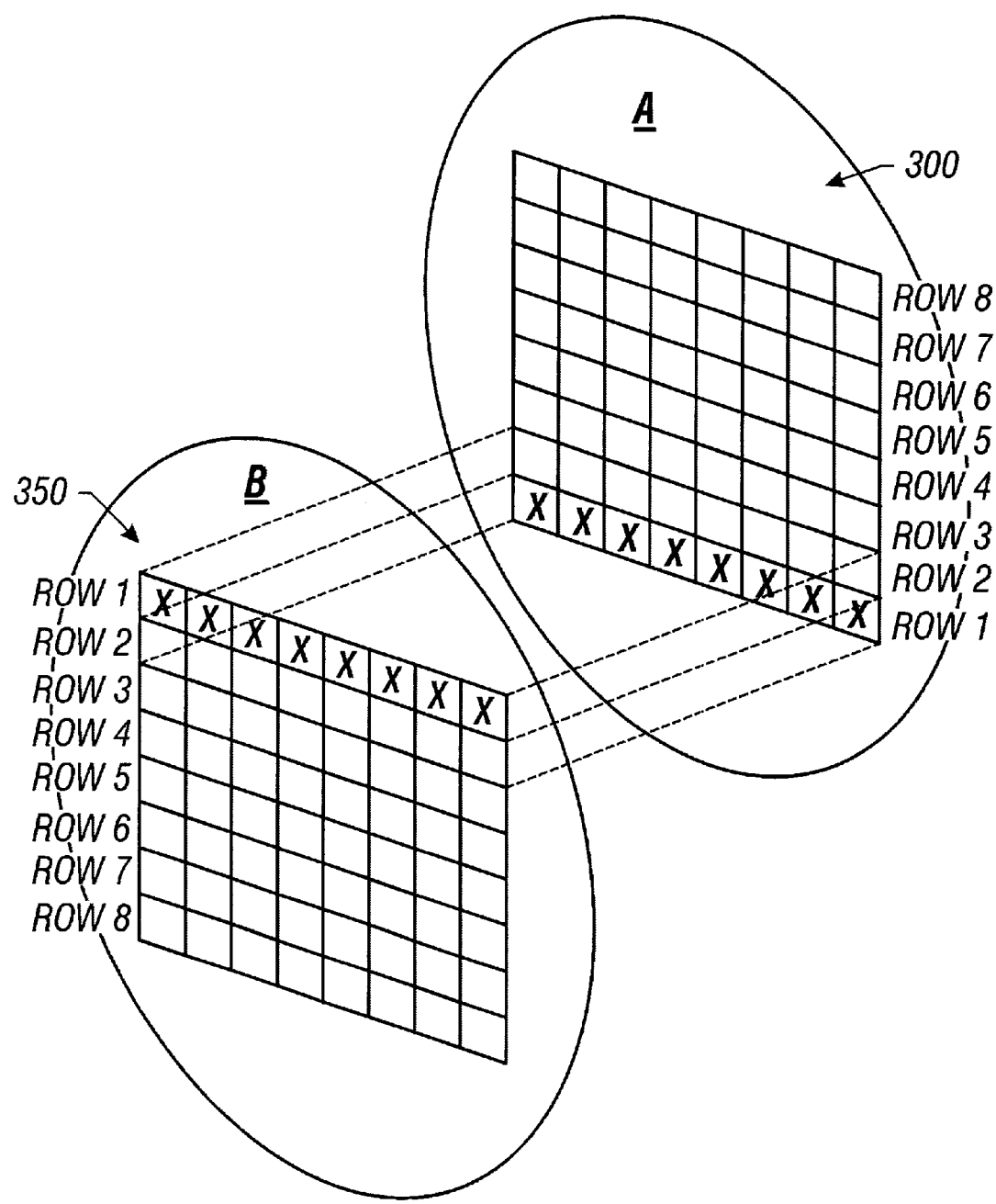
FIG. 6 shows exemplary surfaces arranged to allow further self replication of assembly stations within the SRMS of a most preferred embodiment.

As shown in FIG. 6, once an entire row of assembly stations has been constructed on each wafer 300 and 350, the translation machine may translate the wafers such that row 1 of wafer 300 is aligned across from row 2 of wafer 350, which also aligns row 1 of wafer 350 across from row 2 of wafer 300. The assembly process may be performed in parallel once again, thereby resulting in a total of 32 assembly stations (i.e., 16 assembly stations on each wafer). Accordingly, as shown in greater detail with reference to FIGS. 7A–7H, the assembly process may be performed in an exponential manner such that one assembly station can replicate in n iterations into $O(2^n)$ assembly stations.

Figure 7B:
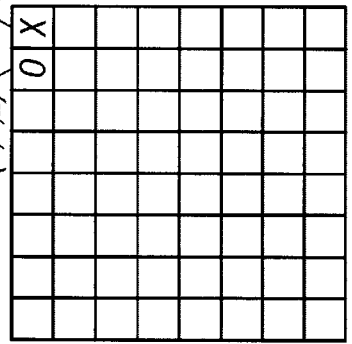
Figure 7B:
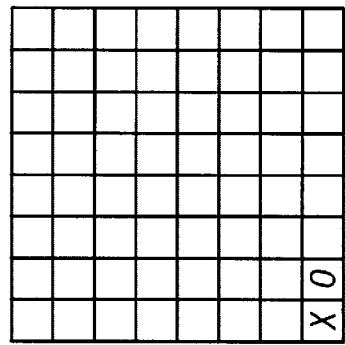
Figure 7A:
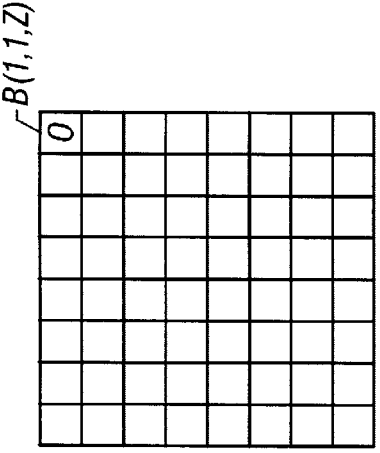
Figure 7A:
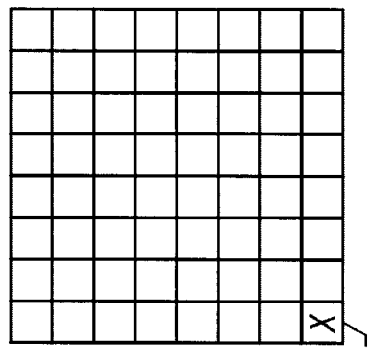

Turning to FIGS. 7A–7H, an exemplary exponential assembly process of a most preferred embodiment is further illustrated, in which assembly stations replicate into $O(2^n)$ assembly stations in n iterations. In FIGS. 7A–7H, an "X" in a site indicates an assembly station within such site, and an "O" in a site indicates a target site at which a facing assembly station is to construct a like assembly station. FIG. 7A shows two surfaces, A and B, wherein an assembly station has been initially constructed at site A(1, 1, Z) of surface A (indicated by an "X"). As discussed above, such an initial construction of an initial assembly station within the SRMS is not achieved via replication, but rather is constructed via some other means. In a most preferred embodiment, the assembly station of site A(1, 1, Z) is aligned with site B(1, 1, Z) to construct a like assembly station at site B(1, 1, Z) of surface B (indicated by an "O"). Once the assembly station is constructed at site B(1, 1, Z), the manufacturing process proceeds to the step shown in FIG. 7B. As shown in FIG. 7B, the assembly station of site A(1, 1, Z) constructs an assembly station at site B(2, 1, Z) and in parallel the assembly station of site B(1, 1, Z) constructs an assembly station at site A(2, 1, Z).

Figure 7D:
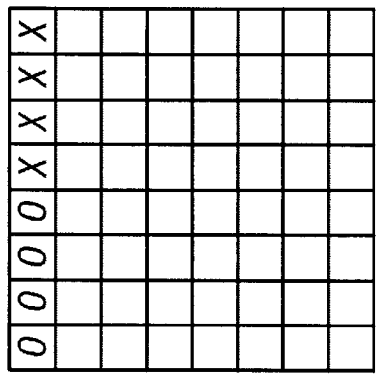
Figure 7D:
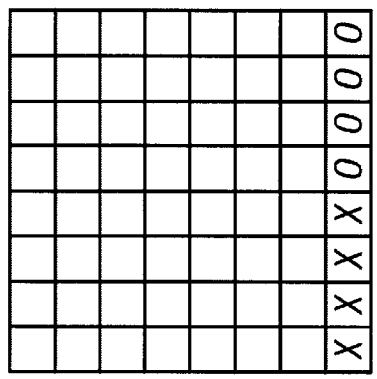
Figure 7C:
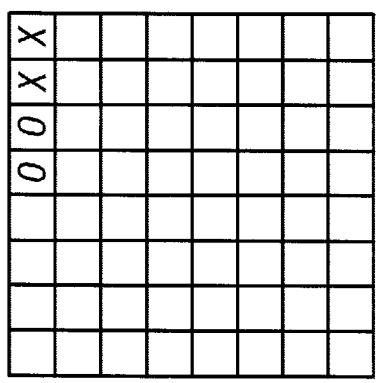
Figure 7C:
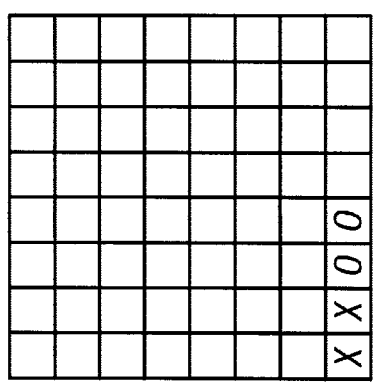
Figures 7E, 7F:
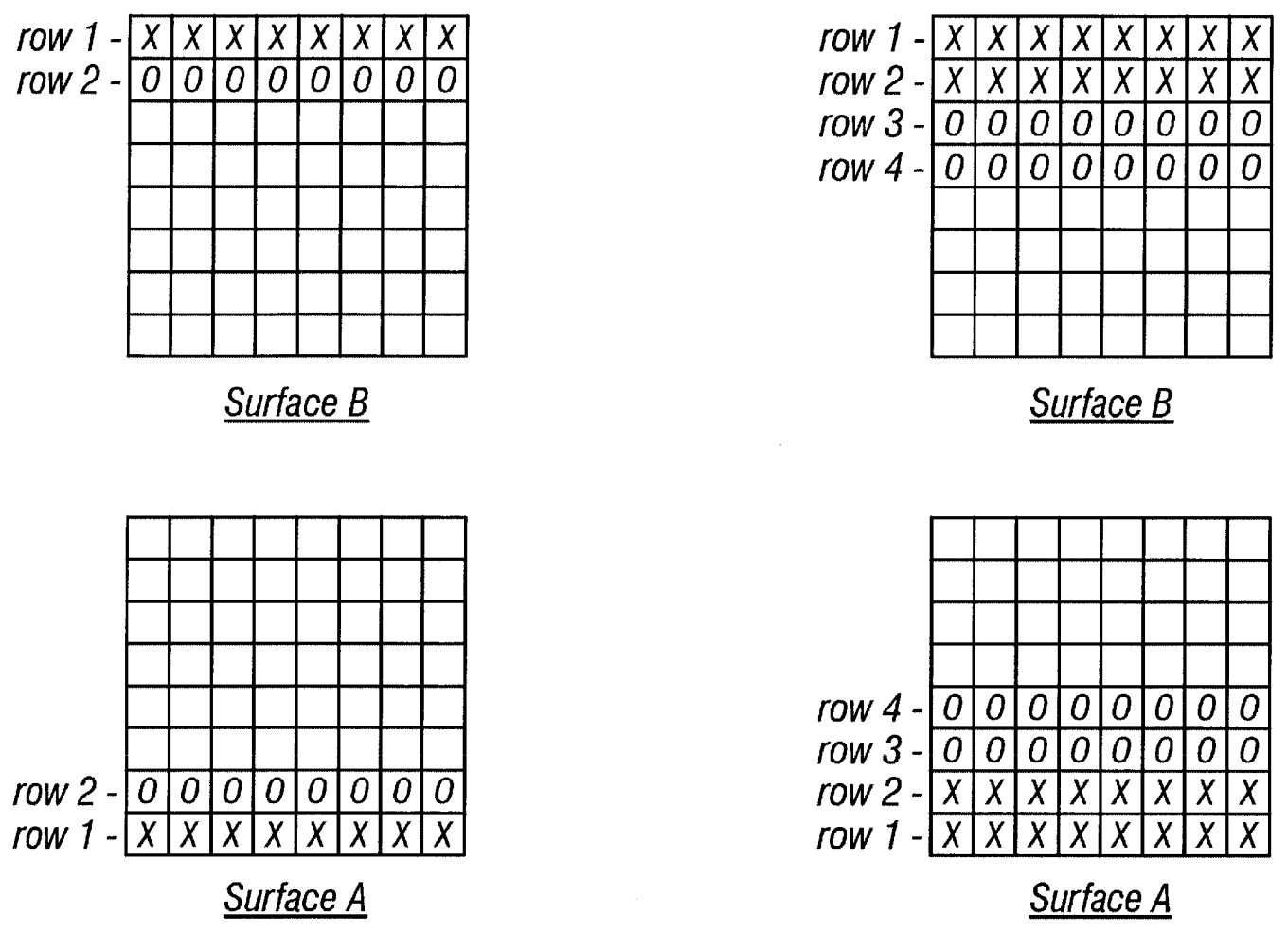

Once the assembly stations are constructed at sites B(2, 1, Z) and A(2, 1, Z), the manufacturing process proceeds to the step shown in FIG. 7C. More specifically, the four assembly stations now constructed are aligned to enable four additional assembly stations to be constructed in parallel at the sites indicated by an "O" on each surface. Once such assembly stations are constructed, the manufacturing process proceeds to the step shown in FIG. 7D. More specifically, the eight assembly stations now constructed on surfaces A and B are aligned to enable eight additional assembly stations to be constructed in parallel at the sites indicated by an "O" on each surface. Once the assembly iteration of FIG. 7D is completed, each surface has an entire row of assembly stations constructed, which may then operate in parallel to construct further assembly stations in the manner shown in FIG. 7E. More specifically, as shown in FIG. 7E, the sixteen assembly stations now constructed are aligned to enable sixteen additional assembly stations to be constructed in parallel at the sites indicated by an "O" on each surface. That is, row 1 of surface A may be aligned with row 2 of surface B to construct assembly stations on row 2 of surface B, and in parallel therewith row 1 of surface B may be aligned with row 2 of surface A to construct assembly stations on row 2 of surface A.

Figures 7G, 7H:
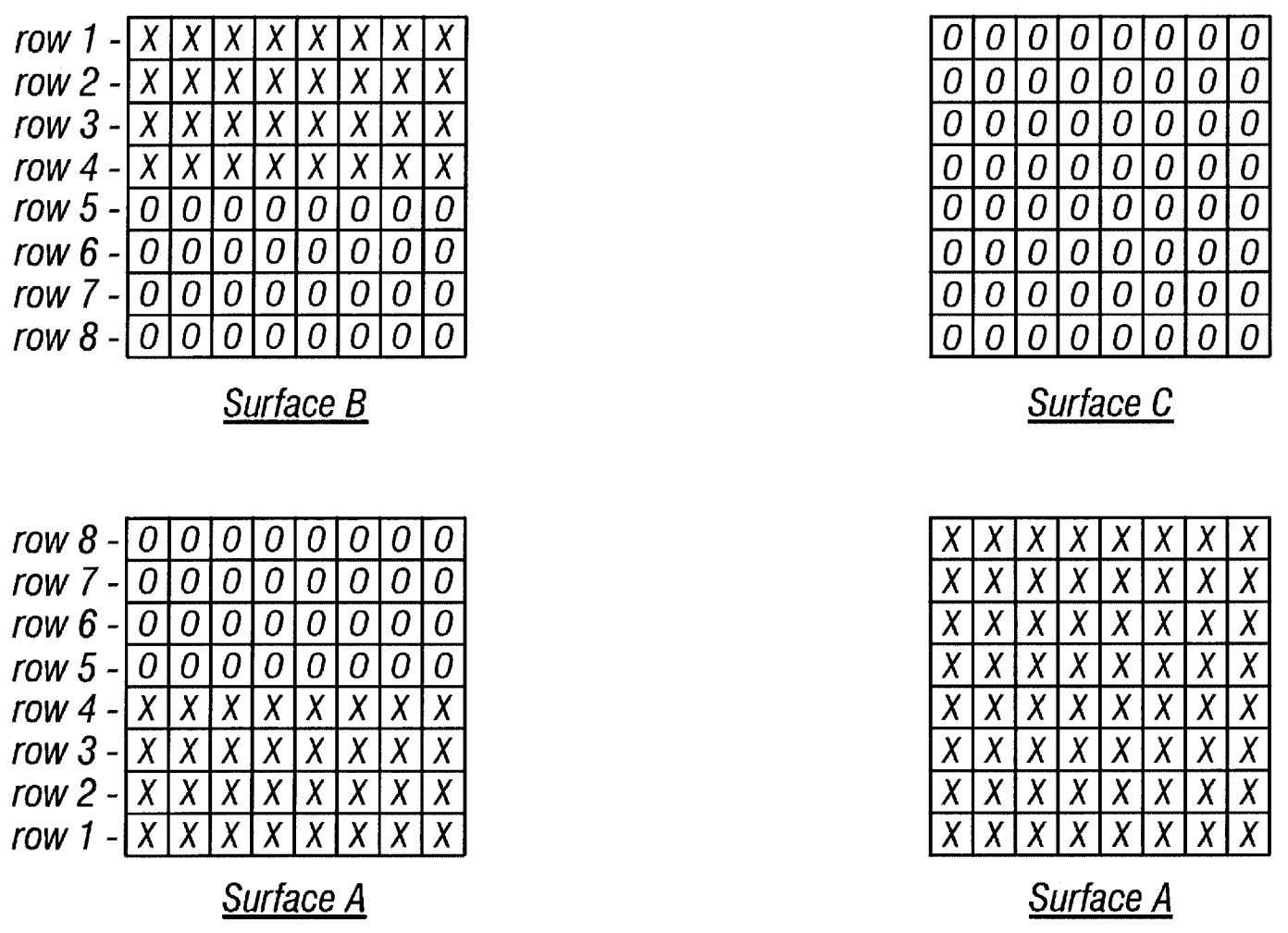

Once the assembly iteration of FIG. 7E is completed, each surface has two rows of assembly stations constructed, which may then operate in parallel to construct further assembly stations in the manner shown in FIG. 7F. More specifically, as shown in FIG. 7F, the 32 assembly stations now constructed are aligned to enable 32 additional assembly stations to be constructed in parallel at the sites indicated by an "O" on each surface. That is, rows 2 and 1 of surface A may be aligned with rows 3 and 4 of surface B, respectively, to construct assembly stations on rows 3 and 4 of surface B, and in parallel therewith rows 2 and 1 of surface B may be aligned with rows 3 and 4 of surface A to construct assembly stations on rows 3 and 4 of surface A. Once the assembly iteration of FIG. 7F is completed, each surface has four rows of assembly stations constructed, which may then operate in parallel to construct further assembly stations in the manner shown in FIG. 7G. More specifically, as shown in FIG. 7G, the 64 assembly stations now constructed are aligned to enable 64 additional assembly stations to be constructed in parallel at the sites indicated by an "O" on each surface. That is, rows 4–1 of surface A may be aligned with rows 5–8 of surface B, 1–5 respectively, to construct assembly stations on rows 5–8 of surface B, and in parallel therewith rows 4–1 of surface B may be aligned with rows 5–8 of surface A to construct assembly stations on rows 5–8 of surface A.

Once the assembly iteration of FIG. 7G is completed, two full surfaces of assembly stations are constructed. Thereafter, as shown in FIG. 7H, completed surface A may be aligned with another surface C to assemble all 64 assembly stations of surface C in parallel. Furthermore, the completed surface B may also be aligned with another surface, surface D (not shown), to assemble all 64 assembly stations of surface D in parallel. It should be understood that the SRMS may be implemented such that completed surfaces A and B assemble further assembly stations on new surfaces C and D in parallel. Accordingly, as illustrated in FIGS. 7A–7H, the SRMS of a most preferred embodiment enables an assembly process that may be performed in an exponential manner such that assembly stations replicate into $O(2^n)$ assembly stations in n iterations. Therefore, in a most preferred embodiment, assembly stations may be constructed through self replication in a very efficient manner.

The above procedure of a most preferred embodiment assumes a square array of die sites with sides that are a power of two. This arrangement ensures that every assembly station has a fresh work site facing it at the beginning of each iteration. However, it should be recognized that many other assembly processes may be implemented within the SRMS of a preferred embodiment. For instance, it may be desirable to fill in the curved areas of wafers 300 and 350 of FIGS. 5 and 6 with additional die sites in order to increase the yield. Such an alternate arrangement may result in some assembly stations being across from flat silicon (or empty space) during some assembly iterations. Such an implementation is not problematic, however, because the assembly stations are preferably implemented to operate in an open-loop fashion, in which the assembly stations across from empty space will just go through the motions along with the other assembly stations, but accomplish nothing. Alternate arrangements may require additional iterations beyond the minimum "N" that a square array requires to assemble a desirably large number of assembly stations. However, such self replicating assembly stations may still provide an efficient assembly process. For instance, once a fully assembled wafer is available, it can be used to assemble a like wafer in a single iteration, regardless of the layout of such wafers.

As described above, in a most preferred embodiment a first wafer 300 is provided along with a facing wafer 350, wherein wafers 300 and 350 are mirror images of each other. It should be recognized that the mirrored wafer is only necessary during construction of the first complete wafer of assembly stations, in a preferred embodiment. That is, once the first wafer is completely assembled, then another wafer may be presented to such completed wafer, and the assembly stations of such completed wafer may construct assembly stations on the presented wafer without such presented wafer being required to construct assembly stations on the completed wafer. Thus, the mirrored coordinate system may be unnecessary for such construction. Additionally, an alternate layout that avoids mirror image assembly stations altogether is to power only a single wafer during each iteration. The shared degrees of freedom provided by the wafer-handling machine (i.e., the translation machine) will only apply to the active wafer. The growth rate in such an implementation is that of the Fibonacci sequence.

In a most preferred embodiment, the SRMS utilizes positional assembly from one surface to another surface via dead reckoning operations (i.e., having no feedback to the control computer). Given the vast number of assembly stations that can be created by the SRMS of a preferred embodiment, the chances of an error occurring in assembling one (or more) of the assembly stations is increased. Additionally, when performing assembly at an exponential rate, a failure early in the process can be damaging as each assembly station may have $2^n$ offspring that rely on its perfect operation. Therefore, it may be desirable to implement a form of testing the assembly stations within the SRMS. Many methods of such testing are possible to implement. In one such testing method, two stations may "shake hands" with each other. The motions of each assembly station will be mirrored by its "Doppleganger" on the surface opposite it. The manipulators therefore will always touch each other when positioned at the halfway point between the two surfaces. A simple continuity test can check whether this has happened. The assembly stations can "shake" at a number of points to ensure that all actuators are functioning properly.

Once a desired number of assembly stations have been constructed through self replication, the assembly stations may then be used directly for some other purpose. For example, the assembly stations may be used to construct other devices. As another example, such assembly stations may be added as a component part of a larger device. For instance, a robotic arm may self replicate into many robotic arms, which may then be implemented within a larger device that requires one or more of such robotic arms. Furthermore, once a wafer of assembly stations is constructed, it may be paired with an application specific wafer that is then assembled via parallel assembly. The application specific wafer may be optimized for a specific manufacturing task and is not capable of self replication.

III. H. Exemplary MS2R Implementation of a Most Preferred Embodiment

The SRMS of a most preferred embodiment has been described above without regard to the type of assembly station implemented therein. It should be understood that any type of assembly station operable to self replicate in such a manufacturing system may be implemented therein, and any such implementation is intended to be within the scope of the present invention. Most preferably, an assembly station that is capable of dead reckoning is implemented so that no feedback control is required in the system.

One implementation of an assembly station that may be utilized within a non-biological SRMS of a most preferred embodiment is shown in FIGS. 8A and 8B. The implementation of the assembly stations of FIGS. 8A and 8B may each be referred to herein as a "MS2R." As will be discussed in greater detail hereafter, such a MS2R may be constructed as a MicroElectroMechanical System (MEMS) device that is suitable for performing micro-assembly operations to produce a like device. The MS2R implementation is intended solely as an example, which renders the disclosure enabling for many other assembly stations that may be implemented within such a non-biological SRMS.

As will be discussed more fully below, the exemplary MS2R implementation of FIG. 8A comprises two rotational degrees of freedom. It should be understood, however, that such an implementation may be modified in various embodiments to enable the manufacturing station more or less rotational degrees of freedom, and any such embodiment is intended to be within the scope of the present invention. For example, the manufacturing station may be implemented as a "MS3R" having three degrees of rotational freedom, or as an "MSLR" having only a single degree of rotational freedom.

As shown in FIG. 8A, a MS2R is provided as an assembly station, which includes two components: a base component 800 and a second ("mating") component 814 on substrate 850. Base component 800 comprises a rotational component 802 (e.g., a "turntable") that is rotatably coupled to the surface of the base component 800. Accordingly, base 800 having turntable 802 provides the MS2R one rotational degree of freedom. As discussed above, in a most preferred embodiment, the MS2R is most preferably coupled to substrate 850 (e.g., a wafer) that is capable of being translated in three dimensions, i.e., along the X, Y, and Z axes, which enables the MS2R three translational degrees of freedom. More specifically, base component 800 of the MS2R may be coupled to substrate 850, such as a wafer. Component 814 of the MS2R further comprises a robotic "arm" 810 that is rotatably coupled to component 814. More specifically, robotic arm 810 may be coupled to a turntable 812, which is rotatably coupled to component 814 to enable arm 810 a rotational degree of freedom. Accordingly, turntable 812 provides a second rotational degree of freedom to the MS2R. It may not be necessary for turntable 802 and/or turntable 812 to provide complete rotational freedom (i.e., 360 degrees of rotation), but instead the MS2R may be implemented such that turntable 802 and/or turntable 812 have some lesser amount of rotational freedom (e.g., capable of rotating 180 degrees or 90 degrees or by any other amount). In the exemplary implementation of FIG. 8A, turntable 802 is capable of rotating between its respective positions 1 and 2 shown and turntable 812 is likewise capable of rotating between its respective positions 1 and 2 shown.

Most preferably, robotic arm 810 includes some type of "gripper," shown as gripper 890, which allows the robotic arm to grip a part in order to perform the necessary pick and place operations for constructing a like MS2R. Such a gripper 890 may be any type of gripper now known or later developed, but is most preferably a gripper as disclosed in the concurrently filed and commonly assigned U.S. patent application Ser. No. 09/569,329 entitled "GRIPPER AND COMPLEMENTARY HANDLE FOR USE WITH MICROCOMPONENTS," the disclosure of which is hereby incorporated herein by reference. Furthermore, mating component 814 preferably includes complementary handle 808 to aid a gripper in grasping mating component 814 (in order to couple the mating component with base component 800).

The MS2R is capable of gripping a part on a facing substrate surface 852 shown in FIG. 8B, picking the part up, rotating the part (e.g., rotating it 90 degrees), and coupling the part in place. For example, the parts to be assembled may include connectors and mating apertures as disclosed in the concurrently filed and commonly assigned U.S. Patent application Ser. No. 09/570,170 entitled "SYSTEM AND METHOD FOR COUPLING MICROCOMPONENTS," the disclosure of which is hereby incorporated herein by reference, which enable the parts to be coupled to one another as desired. For example, in the exemplary implementation of FIG. 8A, mating component 814 includes connector 806 which enables the mating component 814 to be coupled to turntable 802 by inserting connector 806 through mating apertures 804 of turntable 802 of base component 800. Furthermore, should electrical connection be required, connector 806 and aperture 804 may be electrical connectors as disclosed in the concurrently filed and commonly assigned U.S. patent application Ser. No. 09/569,328 entitled "RIBBON CABLE AND ELECTRICAL CONNECTOR FOR USE WITH MICROCOMPONENTS," the disclosure of which is hereby incorporated herein by reference, which enable the parts to be coupled to one another as desired.

An exemplary assembly sequence is as follows: first, an external gripper may be utilized to grasp handle 808, lift mating component 814, rotate mating component 814, and insert connector 806 into mating apertures 804 to couple mating component 814 to turntable 802. At this point, assembly of the first MS2R is complete (i.e., the MS2R of FIG. 8A). FIG. 9A provides an exemplary top view of such an assembled MS2R, and FIG. 9B provides an exemplary side view of such an assembled MS2R. As shown in FIG. 9B, connector 806 of component 814 is preferably utilized to couple component 814 with base component 800 via turntable 802. It should be understood that assembly of such first MS2R may be performed manually and/or by some other robotic assembly device.

Once the first MS2R is assembled, it may be rotated or otherwise positioned to face another substrate having parts thereon necessary for assembling another MS2R, such as substrate 852 of FIG. 8B. Thus, for example, the first MS2R of FIG. 8A may be positioned such that the face of base component 800 faces base component 820 and mating component 822 of FIG. 8B. The turntable 802 of the first MS2R is rotated to its position 2, and the first MS2R is translated to align the gripper 890 of arm 810 with handle 824 of component 822. Gripper 890 of arm 810 engages the handle 824 to grasp and pick up component 822. Turntable 812 of the first MS2R is then rotated approximately 90 degrees to its position 2 in order to rotate grasped component 822. The first MS2R is then translated to align connector 826 of grasped component 822 with mating aperture 828 of turntable 803 of component 820, and then the first MS2R is translated to insert connector 826 into mating aperture 828 to couple components 822 to 820. Gripper 890 of arm 810 then releases grasped handle 824 of component 822, and assembly of components 820 and 822 into a second, like MS2R is complete. Such second MS2R may then utilize its components (e.g., its arm having gripper 892) to assemble further MS2Rs in a similar manner. Accordingly, the MS2R assembly station is capable of replicating by assembling like assembly stations.

While an exemplary implementation of a MS2R has been disclosed above, a manufacturing station having more or less than two degrees of rotational freedom is intended to be within the scope of the present invention. For example a MS1R having only a single degree of rotational freedom may be implemented to self-replicate if the components to be assembled are suitably arranged.

As discussed above, in a preferred embodiment an SRMS is provided, which utilizes positional assembly. Accordingly, parts to be assembled into an assembly station are provided in appropriate locations within an acceptable degree of error on a surface (e.g., on a die site of a wafer). In a most preferred embodiment, such parts may be fabricated and/or positioned on a die site. A fabrication process as disclosed in U.S. Pat. No. 4,740,410 issued to Muller et al. entitled "MICROMECHANICAL ELEMENTS AND METHODS FOR THEIR FABRICATION," and/or a fabrication process as disclosed in U.S. Pat. No. 5,660,680 issued to Chris Keller entitled "METHOD FOR FABRICATION OF HIGH VERTICAL ASPECT RATIO THIN FILM STRUCTURES," as well as U.S. Pat. No. 5,645,684 issued to Chris Keller entitled "MULTILAYER HIGH VERTICAL ASPECT RATIO THIN FILM STRUCTURES," may be utilized, as examples. An example of a most preferred fabrication process that may be utilized is described in greater detail herein below with reference to FIG. 11. The exemplary fabrication process described below enables totally releasable MEMS components (e.g., capable of being totally released from the substrate or wafer) with such MEMS components having electrical isolation.

Figure 11:
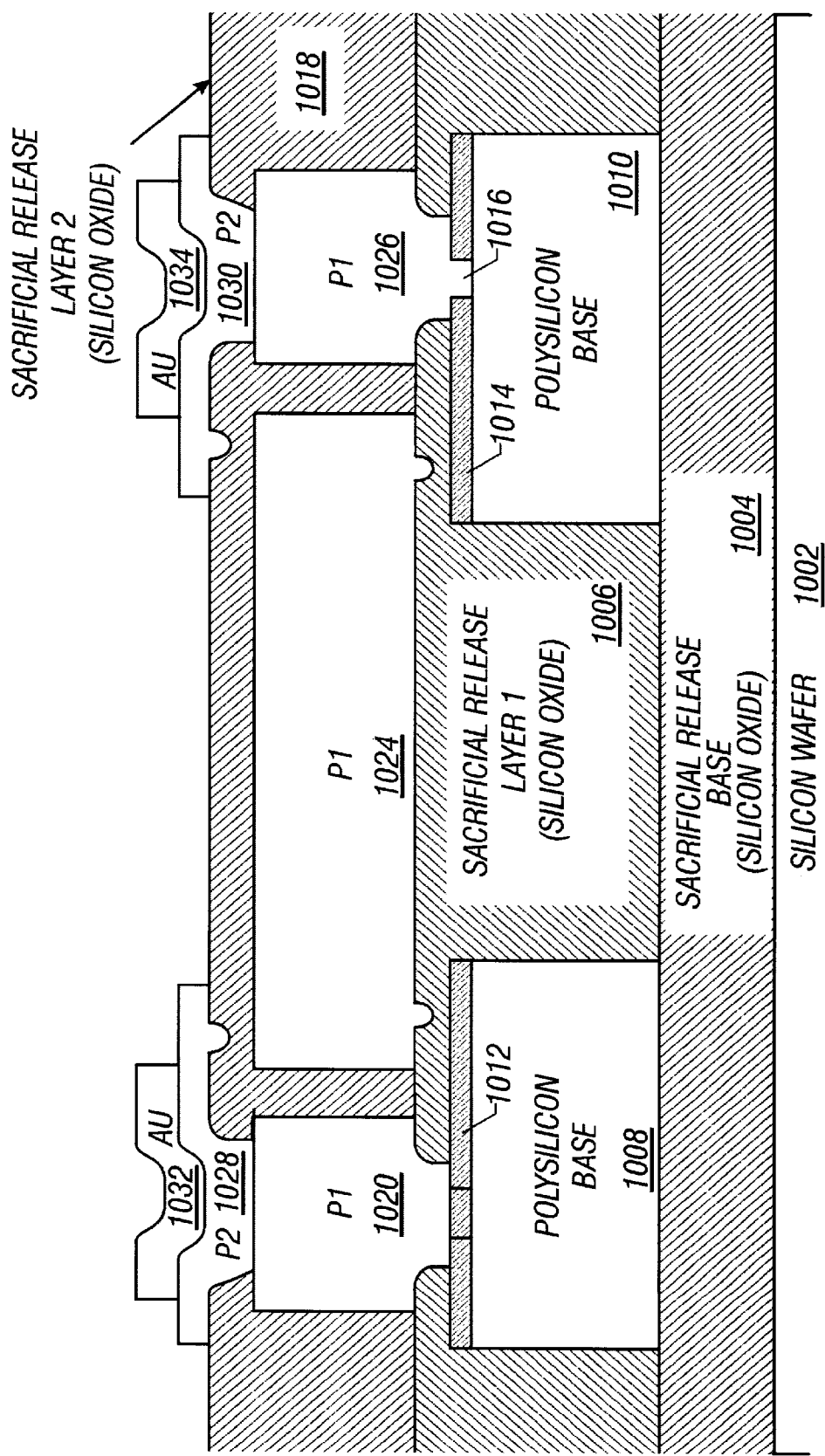
FIG. 11 shows an exemplary fabrication process that may be utilized to fabricate totally releasable MEMS components having electrical isolation, such components may enable assembly stations according to a preferred embodiment of the present invention.

Turning to FIG. 11, such an exemplary fabrication process is described, wherein a substrate, such as silicon wafer 1002, is provided. Sacrificial release base 1004, which may comprise silicon oxide, is first deposited on wafer 1002. Thereafter, a conducting base layer is deposited, which preferably comprises low stress polysilicon to form a polysilicon base layer. An insulating material, such as silicon nitride, is then deposited to cap such conducting base layer with such insulating material. The insulating material and conducting base layer are then patterned (e.g., using known lithography techniques), which may, for example, result in separate conducting base layers 1008 and 1010 that are each capped with insulating layers 1012 and 1014, respectively. In patterning the insulating layer, an aperture may be formed to allow for access to the base conducting layer, as shown at 1016 in insulating material 1014. A layer of sacrificial release material (e.g., silicon oxide) is then deposited, to form sacrificial release layer 1, shown as layer 1006 in FIG. 11. Sacrificial release layer 1 may then be patterned, and then a conducting layer (e.g., polysilicon) may be deposited, which may be referred to as a "poly 1" or "P1" layer.

The newly deposited conducting layer may then be patterned, which may, for example, result in separate P1 components 1020, 1024, and 1026. Another layer of sacrificial release material (e.g., silicon oxide) is then deposited, to form sacrificial release layer 2, shown as layer 1018 in FIG. 11. Sacrificial release layer 2 may then be patterned, and then another conducting layer (e.g., polysilicon) may be deposited, which may be referred to as a "poly 2" or "P2" layer. The newly deposited conducting layer may then be patterned, which may, for example, result in separate P2 components 1028 and 1030. Thereafter, a good conducting material (e.g., gold) may be deposited and patterned to form, for example, gold layers 1032 and 1034. Of course, any number of successive layers may be formed in a similar manner. Finally, the component may be released, by exposing sacrificial release layers 1 and 2 and the sacrificial release base to a releasing agent, such as hydrofluoric acid (HF). Thus, the resulting MEMS component fabricated with such process may be totally released from the wafer and have electrical isolation. It should be recognized that, in alternative embodiments, such parts may be fabricated and/or positioned at appropriate locations of a surface using any fabrication or positioning method now known or later developed.

A most preferred embodiment has been described above as having a MS2R implemented as an assembly station. However, it should be understood that the SRMS of the present invention is not intended to be limited solely to an embodiment having a MS2R implemented as an assembly station. Rather, any assembly station may be implemented in alternative embodiments, and any such embodiments are intended to be within the scope of the present invention. Additionally, a most preferred embodiment has been described above as replicating assembly stations at an exponential rate. For example, in one embodiment assembly stations replicate within the SRMS according to a fibonacii sequence, and in another embodiment an assembly station may replicate into $O(2^n)$ assembly stations in n iterations. However, it should be recognized that the SRMS of the present invention is not intended to be limited solely to an embodiment in which assembly stations replicate exponentially. Rather, various embodiments may be implemented such that the assembly stations do not replicate at an exponential rate, and any such embodiments are intended to be within the scope of the present invention. As one example, a single assembly station may construct like assembly stations sequentially.

A most preferred embodiment has been described above in which assembly stations perform dead reckoning operations to construct like assembly stations (i.e., to replicate). For example, assembly stations may receive assembly instructions from a control computer, and the assembly stations may construct like assembly stations without providing feedback information to the control computer. However, it should be recognized that the SRMS of the present invention is not intended to be limited solely to an embodiment in which assembly stations perform dead reckoning operations. Rather, various embodiments may be implemented such that the assembly stations provide some type of feedback information to a control computer in constructing like assembly stations, and any such embodiments are intended to be within the scope of the present invention.

A most preferred embodiment has been described above in which small scale (e.g., micron-scale or nanometer-scale) assembly stations construct like assembly stations (i.e., further micron-scale or nanometer-scale assembly stations). However, it should be recognized that the SRMS of the present invention is not intended to be limited solely to an embodiment in which small scale assembly stations perform small scale assembly operations (e.g., micro-assembly or nano-assembly operations). Rather, various embodiments may be implemented such that the assembly stations are any size and construct like assembly stations from parts that are of any size, and any such embodiments are intended to be within the scope of the present invention.

The SRMS of a preferred embodiment has been described above as enabling assembly stations to construct further like assembly stations. It should be recognized that the SRMS need not be implemented such that the assembly station(s) construct identical assembly station(s). The SRMS of a preferred embodiment may provide a general manufacturing system that is capable of assembling a specific manufacturing system. Such specific manufacturing system may be identical to the general manufacturing system (i.e., may in effect be another "general manufacturing system"), or it may be different from the general manufacturing system. For example, the SRMS of a preferred embodiment may be implemented to enable multi-generational growth of assembly stations, in which a first generation of assembly station(s) assemble a second (or "later") generation of assembly station(s). Thereafter, such later generation of assembly stations may further assemble even later generation of assembly stations, and so on. It should be understood that the assembly stations of each generation may be identical. However, in some implementations the assembly stations of each generation may be "like" assembly stations that are not necessarily identical. For example, the size of one or more generations of assembly stations may differ from that of the earlier generations. For instance, a first generation may assemble a second generation of assembly stations that are downscaled or upscaled from the first generation. As another example, the assembly stations of one or more later generations may be completely different than the earlier generations of assembly stations. For instance, the initial assembly station (i.e., the first generation assembly station) may be different in some way than the later generations resulting therefrom. As one example, the initial assembly station may have a relatively large size, but is capable of constructing much smaller scale assembly stations, which are in turn capable of constructing such smaller scale assembly stations. Alternatively, the final generation constructed may be unable to construct further generations, but may have some other useful function. For example, each successive generation may be constructed on a smaller scale, such that the final generation may be on such a small scale that it is incapable of constructing further generations, but the final generation may be a desirable size and have some other useful function. Alternatively still, generation X of assembly stations may manufacture generation Y of assembly stations, wherein the assembly stations of generation Y are specialized in that they are capable of efficiently constructing a specific final product, but may not be suitable for efficiently constructing the more general purpose assembly stations of generation X. The construction principles described above may be applied to such implementations of assembly stations, irrespective of whether each generation is identical. For instance, the SRMS may be implemented to enable the generations to grow at an exponential rate, irrespective of whether each generation is identical.

Furthermore, it should be recognized that each assembly station may actually comprise multiple assembly stations (or "sub-assembly stations"). Thus, multiple subassembly stations may work together to construct another assembly station, which may also comprise multiple sub-assembly stations. For example, each sub-assembly station of an assembly station may assemble a portion of another assembly station. For instance, a first assembly station may comprise two sub-assembly stations, A and B. Sub-assembly station A may function to assemble a sub-assembly station B on a facing surface, and sub-assembly station B may function to assemble a sub-assembly station A on such facing surface, thereby resulting in a second assembly station that comprises sub-assembly stations A and B.

A most preferred embodiment has been described above in which assembly stations may construct both like and non-like devices using lithographically-produced parts. However, it should be recognized that the SRMS of the present invention is not intended to be limited solely to an embodiment in which assembly stations perform small-scale assembly operations on lithographically-produced parts. Rather, various embodiments may be implemented such that assembly stations may construct both like and non-like devices from parts produced using any other process now known or later developed, including (but not limited to) biochemical (e.g., self-assembling monolayers), complementary molecular (e.g., solid nucleotide structures), or mechanical means, and any such embodiments are intended to be within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of manufacturing comprising the steps of:
   providing a first surface having at least an initial assembly station thereon;
   providing a second surface having parts for constructing at least one other assembly station;
   causing said at least an initial assembly station to construct at least one like assembly station from the parts on said second surface; and
   causing at least one assembly station on said second surface to construct at least one like assembly station on said first surface from parts on said first surface.

2. The method of claim 1 wherein said parts are prearranged on said second surface.

3. The method of claim 1 further including the step of:
   constructing said initial assembly station on said first surface.

4. The method of claim 1 wherein said first and second surfaces are wafers.

5. The method of claim 4 wherein said wafers each include at least one die site on which said parts are prearranged.

6. The method of claim 1 wherein said like assembly station is an assembly station having at least one degree of rotational freedom.

7. A method of manufacturing comprising the steps of:
   providing a first surface having at least an initial assembly station thereon;
   providing a second surface having parts for constructing at least one other assembly station; and
   causing said at least an initial assembly station to construct at least one like assembly station from the parts on said second surface, wherein said like assembly station comprises at least two degrees of rotational freedom.

8. The method of claim 1 wherein said initial assembly station is an assembly station having at least one degree of rotational freedom.

9. A method of manufacturing comprising the steps of:
   providing a first surface having at least an initial assembly station thereon, wherein said initial assembly station is an assembly station having at least two degrees of rotational freedom;
   providing a second surface having parts for constructing at least one other assembly station; and
   causing said at least an initial assembly station to construct at least one like assembly station from the parts on said second surface.

10. The method of claim 1 wherein said causing step further includes:
    communicating instructions from a control computer to said at least an initial assembly station.

11. The method of claim 10 wherein said communicating said instructions is via a broadcast architecture.

12. The method of claim 10 wherein said control computer is associated with a particular assembly station for communicating said instructions only to said particular assembly station.

13. The method of claim 10 wherein said at least an initial assembly station constructs said at least one like assembly station utilizing dead reckoning operations.

14. The method of claim 13 wherein said dead reckoning operations include operations in which no feedback is provided from said at least an initial assembly station to said control computer.

15. The method of claim 10 wherein said at least an initial assembly station provides feedback to said control computer in constructing said at least one like assembly station.

16. The method of claim 15 wherein said feedback includes sensor-driven feedback.

17. The method of claim 16 wherein said sensor-driven feedback includes feedback driven by positional sensors.

18. A method of manufacturing comprising the steps of:
    providing a first surface having at least an initial assembly station thereon;
    providing a second surface having parts for constructing at least one other assembly station;
    translating at least one of said first and second surfaces with respect to the other of said first and second surfaces; and
    causing said at least an initial assembly station to construct at least one like assembly station from the parts on said second surface.

19. The method of claim 18 wherein said translating simultaneously translates all assembly stations of at least one of said first and second surfaces with respect to the other of said first and second surfaces.

20. The method of claim 18 further including the step of:
    causing at least one assembly station on said second surface to construct at least one like assembly station on said first surface from parts on said first surface.

21. The method of claim 1 wherein said parts on said first surface are prearranged on said first surface.

22. The method of claim 1 further including the step of:
    causing said at least one assembly station on said first surface to construct at least one like assembly station on said second surface from parts on said second surface, and causing said at least one assembly station on said second surface to construct at least one like assembly station on said first surface from parts on said first surface in a ping-pong manner.

23. The method of claim 1 further including the step of:
    causing said at least one assembly station on said second surface to construct at least one like assembly station on said first surface from parts on said first surface in parallel with said causing said at least an initial assembly station to construct at least one like assembly station from the parts on said second surface.

24. A method of manufacturing comprising the steps of:
    providing a first surface having at least an initial assembly station thereon;
    providing a second surface having parts for constructing at least one other assembly station;
    causing said at least an initial assembly station to construct at least one like assembly station from the parts on said second surface; and
    causing said assembly stations to replicate at an exponential rate.

25. The method of claim 24 further including the step of:
    causing said assembly stations to replicate according to a Fibonacci sequence.

26. The method of claim 24 further including the step of:
    causing said assembly stations to replicate in a manner such that n assembly iterations result in on the order of 2n assembly stations.

27. The method of claim 1 wherein said assembly station is a micron-scale assembly station.

28. A method of manufacturing comprising the steps of:
    providing a first surface having at least an initial assembly station thereon;

providing a second surface having parts for constructing at least one other assembly station; and causing said at least an initial assembly station to construct at least one like assembly station from the parts on said second surface, wherein said like assembly station is an assembly station selected from the group consisting of nanometer-scale assembly station and molecular-scale assembly station.

29. The method of claim 1 wherein said assembly station is a MEMS device.

30. The method of claim 1 wherein said parts are micron-scale parts.

31. The method of claim 30 further comprising the step of: producing said parts using a lithographically-based process.

32. The method of claim 1 further comprising the step of: producing said parts by a process selected from the group consisting of lithographic, self-assembly, complementary molecular, and mechanical processes.

33. A method of manufacturing comprising the steps of:
providing a first surface having at least an initial assembly station thereon;
providing a second surface having parts for constructing at least one other assembly station, wherein said parts are selected from the group consisting of nanometer-scale parts and molecular-scale parts; and
causing said at least an initial assembly station to construct at least one like assembly station from the parts on said second surface.

34. A method of manufacturing comprising the steps of:
providing a first surface having at least an initial assembly station thereon;
providing a second surface having parts for constructing at least one other assembly station, wherein said first and second surfaces face each other and wherein said first and second surfaces are arranged as mirror images of each other; and
causing said at least an initial assembly station to construct at least one like assembly station from the parts on said second surface.

35. The method of claim 1 further comprising the step of: causing said at least one like assembly station to construct at least one non-like device.

36. A non-biological self replicating manufacturing system comprising:
a translating machine capable of translating at least a first surface in relation to at least a second surface, wherein said at least a first surface comprises at least one assembly station thereon and wherein said at least a second surface comprises parts arranged thereon for use in constructing at least one other assembly station; and
a control system for controlling the operation of said translating machine and for controlling said at least one assembly station to cause said at least one assembly station to construct at least one other assembly station from said parts on said second surface.

37. The system of claim 36 wherein said at least one other assembly station is a like assembly station.

38. The system of claim 37 wherein said like assembly station is identical to said at least one assembly station.

39. The system of claim 37 wherein said like assembly station is a mirror image of said at least one assembly station.

40. The system of claim 37 wherein said like assembly station is a smaller-scale assembly station than said at least one assembly station.

41. The system of claim 37 wherein said like assembly station is a larger-scale assembly station than said at least one assembly station.

42. The system of claim 36 wherein said parts are selected from the group consisting of micron-scale parts, nanometer-scale parts, and molecular-scale parts.

43. The system of claim 42 wherein said parts are lithographically-based parts.

44. The system of claim 36 wherein said at least one assembly station is a microscale assembly station.

45. The system of claim 36 wherein said at least one assembly station of said at least a first surface have shared translational degrees of freedom with any other ones of said at least one assembly station of said at least a first surface with respect to said at least a second surface.

46. A method of manufacturing assembly stations comprising the steps of:
presenting at least a first group of parts on a first surface to at least a first group of assembly stations, wherein said at least a first group of parts comprise parts selected from the group consisting of nanometer-scale parts and molecular-scale parts; and
causing said at least a first group of assembly stations to construct at least a second group of like assembly stations from said at least a first group of parts.

47. The method of claim 46 wherein said first group of assembly stations are on a second surface.

48. The method of claim 46 wherein said at least a first group of parts are prearranged on said first surface.

49. A method of manufacturing assembly stations comprising the steps of:
presenting at least a first group of parts on a first surface to at least a first group of assembly stations;
causing said at least a first group of assembly stations to construct at least a second group of like assembly stations from said at least a first group of parts;
presenting at least a second group of parts on a second surface to said at least a second group of like assembly stations; and
causing said at least a second group of like assembly stations to construct at least a third group of like assembly stations from said at least a second group of parts.

50. The method of claim 49 wherein said at least a second group of parts are prearranged on said second surface.

51. The method of claim 49 wherein said at least a second group of assembly stations are on said first surface.

52. The method of claim 49 wherein said first and said second surfaces are surfaces of the same substrate.

53. The method of claim 49 wherein said at least a first group of assembly stations are on said second surface and said at least a second group of assembly stations are on said first surface.

54. The method of claim 53 wherein said at least a third group of assembly stations are on said second surface.

55. The method of claim 49 wherein said first, second, and third groups of assembly stations each include at least one assembly station.

56. The method of claim 49 further including the steps of:
in parallel with said presenting at least a second group of parts on said second surface to said at least a second group of like assembly stations and said causing said at least a second group of like assembly stations to construct at least a third group of like assembly stations from said at least a second group of parts, presenting at least a third group of parts on said first surface to at least said first group of assembly stations and causing said at least a first group of assembly stations to construct at least a fourth group of like assembly stations from said at least a third group of parts.

57. The method of claim 46 wherein said at least a second group of like assembly stations are identical to said at least a first group of assembly stations.

58. A method of manufacturing assembly stations comprising the steps of:
presenting at least a first group of parts on a first surface to at least a first group of assembly stations;
causing said at least a first group of assembly stations to construct at least a second group of like assembly stations from said at least a first group of parts, wherein said at least a second group of like assembly stations are mirror images of said at least a first group of assembly stations.

59. The method of claim 46 wherein said at least a second group of like assembly stations are smaller-scale assembly stations than said at least a first group of assembly stations.

60. The method of claim 46 wherein said at least a second group of like assembly stations are larger-scale assembly stations than said at least a first group of assembly stations.

61. The method of claim 49 wherein said at least a first group of parts are selected from the group consisting of: micron-scale parts, nanometer-scale parts, and molecular-scale parts.

62. A non-biological self replicating manufacturing system comprising:
a first surface including at least a first generation of assembly stations thereon, wherein said at least a first generation of assembly stations includes at least one assembly station; and
a control system operable to cause said at least a first generation of assembly stations to construct at least a second generation of assembly stations from parts on a second surface, wherein said parts are selected from the group consisting of nanometer-scale parts and molecular-scale parts.

63. The system of claim 62 wherein said at least a second generation of assembly stations includes at least one assembly station.

64. The system of claim 62 wherein said at least a second generation of assembly stations is identical to said at least a first generation of assembly stations.

65. A non-biological self replicating manufacturing system comprising:
a first surface including at least a first generation of assembly stations thereon, wherein said at least a first generation of assembly stations includes at least one assembly station; and
a control system operable to cause said at least a first generation of assembly stations to construct at least a second generation of assembly stations from parts on a second surface, wherein said at least a second generation of assembly stations is a mirror image of said at least a first generation of assembly stations.

66. The system of claim 62 wherein said at least a second generation of assembly stations are smaller-scale assembly stations than said at least a first generation of assembly stations.

67. The system of claim 62 wherein said at least a second generation of assembly stations are larger-scale assembly stations than said at least a first generation of assembly stations.

68. The system of claim 62 wherein said parts are prearranged on said second surface.

69. The system of claim 68 wherein said control system is operable to cause said at least a first generation of assembly stations to perform positional assembly to construct said at least a second generation of assembly stations.

70. The system of claim 69 wherein said control system is operable to cause said at least a first generation of assembly stations to construct said at least a second generation of assembly stations without requiring feedback to said control system from said initial generation of assembly stations.

71. A non-biological self replicating manufacturing system comprising:
a first surface including at least a first generation of assembly stations thereon, wherein said at least a first generation of assembly stations includes at least one assembly station; and
a control system operable to cause said at least a first generation of assembly stations to construct at least a second generation of assembly stations from parts on a second surface; and
said control system operable to cause said at least a second generation of assembly stations to assemble at least a third generation of assembly stations from parts included on a third surface.

72. The system of claim 71 wherein said third surface and said first surface are both surfaces on the same substrate.

73. The system of claim 62 wherein each assembly station of said at least a first generation of assembly stations comprises multiple sub-assembly stations.

74. The system of claim 73 wherein a first one of said multiple sub-assembly stations is operable to construct a first sub-assembly station on said second surface, and wherein a second one of said multiple sub-assembly stations is operable to construct a second sub-assembly station on said second surface.

75. A non-biological self replicating manufacturing system comprising:
a first surface including at least a first generation of assembly stations thereon, wherein said at least a first generation of assembly stations includes at least one assembly station and wherein each assembly station of said at least a first generation of assembly stations comprises multiple sub-assembly stations; and
a control system operable to cause said at least a first generation of assembly stations to construct at least a second generation of assembly stations from parts on a second surface, wherein a first one of said multiple sub-assembly stations is operable to construct a first subassembly station on said second surface, and wherein a second one of said multiple subassembly stations is operable to construct a second sub-assembly station on said second surface, and wherein an assembly station of said at least a second generation of assembly stations comprises said first and second sub-assembly stations on said second surface.

76. The system of claim 71 wherein said parts are selected from the group consisting of: micron-scale parts, nanometer-scale parts, and molecular-scale parts.

77. The system of claim 62 wherein said parts are prearranged on said second surface to enable positional assembly.

78. The system of claim 62 wherein said first and second surfaces are wafers.

79. The system of claim 62 wherein said control system comprises a computer system.

80. The system of claim 62 wherein said control system comprises a microcontroller.

81. A method of manufacturing assembly stations comprising the steps of:
providing a first surface comprising at least one assembly station thereon;
causing said at least one assembly station to construct said at least another assembly station from parts on a second surface, wherein said parts are selected from the group consisting of nanometer-scale parts and molecular-scale parts.

82. The method of claim 81 wherein said parts are prearranged on said second surface.

83. The method of claim 81 wherein said at least another assembly station is a like assembly station.

84. The method of claim 81 wherein said at least another assembly station is an assembly station identical to said at least one assembly station.

85. The method of claim 81 wherein said at least one assembly station comprises at least two sub-assembly stations.

86. A method of manufacturing assembly stations comprising the steps of:
providing a first surface comprising at least one assembly station thereon, wherein said at least one assembly station comprises at least two sub-assembly stations; and
causing said at least one assembly station to construct said at least another assembly station from parts on a second surface, wherein said second surface comprises parts prearranged thereon for constructing at least two sub-assembly stations.

87. A method of manufacturing assembly stations comprising the steps of:
providing a first surface comprising at least one assembly station thereon, wherein said at least one assembly station comprises at least two sub-assembly stations; and
causing said at least one assembly station to construct said at least another assembly station from parts on a second surface, wherein said at least another assembly station comprises at least two sub-assembly stations.

88. A method of manufacturing assembly stations comprising the steps of:
providing a first surface comprising at least one assembly station thereon, wherein said at least one assembly station comprises at least two sub-assembly stations that are non-like sub-assembly stations; and
causing said at least one assembly station to construct said at least another assembly station from parts on a second surface.

89. A method of manufacturing assembly stations comprising the steps of:
providing a first surface comprising at least one assembly station thereon, wherein said at least one assembly station comprises at least two sub-assembly stations that are like sub-assembly stations; and
causing said at least one assembly station to construct said at least another assembly station from parts on a second surface.

90. The method of claim 86 wherein said parts are selected from the group consisting of: micron-scale parts, nanometer-scale parts, and molecular-scale parts.

91. The method of claim 7 further comprising the step of:
causing said at least one like assembly station to construct at least one non-like device.

92. The method of claim 9 further comprising the step of:
causing said at least one like assembly station to construct at least one non-like device.

93. The method of claim 18 further comprising the step of:
causing said at least one like assembly station to construct at least one non-like device.

94. The method of claim 24 further comprising the step of:
causing said at least one like assembly station to construct at least one non-like device.

95. The method of claim 28 further comprising the step of:
causing said at least one like assembly station to construct at least one non-like device.

96. The method of claim 33 further comprising the step of:
causing said at least one like assembly station to construct at least one non-like device.

97. The method of claim 34 further comprising the step of:
causing said at least one like assembly station to construct at least one non-like device.

98. The method of claim 46 further comprising the step of:
causing said at least a second group of like assembly stations to construct at least one non-like device.

99. The method of claim 49 further comprising the step of:
causing at least one of said at least a second group of like assembly stations and said at least a third group of like assembly stations to construct at least one non-like device.

100. The method of claim 58 further comprising the step of:
causing said at least a second group of like assembly stations to construct at least one non-like device.

101. The system of claim 62 wherein said at least a second generation of assembly stations are operable to construct at least one non-like device.

102. The system of claim 65 wherein said at least a second generation of assembly stations are operable to construct at least one non-like device.

103. The system of claim 71 wherein at least one of said at least a second generation of assembly stations and said at least a third generation of assembly stations is operable to construct at least one non-like device.

104. The system of claim 75 wherein said at least a second generation of assembly stations are operable to construct at least one non-like device.

105. The method of claim 85 further comprising the step of:
causing said at least another assembly station to construct at least one non-like device.

106. The method of claim 86 further comprising the step of:
causing said at least another assembly station to construct at least one non-like device.

107. The method of claim 87 further comprising the step of:
causing said at least another assembly station to construct at least one non-like device.

108. The method of claim 88 further comprising the step of:
causing said at least another assembly station to construct at least one non-like device.

109. The method of claim 89 further comprising the step of:
causing said at least another assembly station to construct at least one non-like device.

\* \* \* \* \*

UNITED STATES PATENT AND TRADEMARK OFFICE
CERTIFICATE OF CORRECTION

PATENT NO. : 6,510,359 B1
DATED : January 21, 2003
INVENTOR(S) : Ralph Merkle et al.

It is certified that error appears in the above-identified patent and that said Letters Patent is hereby corrected as shown below:

Column 18,
Line 1, delete "to"

Column 23,
Line 35, delete "H."

Signed and Sealed this

Third Day of June, 2003

JAMES E. ROGAN
*Director of the United States Patent and Trademark Office*